United States Patent
Balcar et al.

(10) Patent No.: US 12,041,381 B2
(45) Date of Patent: Jul. 16, 2024

(54) PASSIVE INFRARED SENSING AND DETECTION FOR TRAFFIC

(71) Applicant: THE BOARD OF REGENTS OF THE UNIVERSITY OF TEXAS SYSTEM, Austin, TX (US)

(72) Inventors: Zachary Balcar, Adkins, TX (US); Ayetullah Baha Biten, San Antonio, TX (US); Sara Ahmed, San Antonio, TX (US); Samer Dessouky, Helotes, TX (US); Jerome Helffrich, San Antonio, TX (US)

(73) Assignees: BOARD OF REGENTS, THE UNIVERSITY OF TEXAS SYSTEM, Austin, TX (US); SOUTHWEST RESEARCH INSTITUTE, San Antonio, TX (US)

( * ) Notice: Subject to any disclaimer, the term of this patent is extended or adjusted under 35 U.S.C. 154(b) by 285 days.

(21) Appl. No.: 17/602,438

(22) PCT Filed: Apr. 8, 2020

(86) PCT No.: PCT/US2020/027159
§ 371 (c)(1),
(2) Date: Oct. 8, 2021

(87) PCT Pub. No.: WO2020/210290
PCT Pub. Date: Oct. 15, 2020

(65) Prior Publication Data
US 2022/0172610 A1 Jun. 2, 2022

Related U.S. Application Data

(60) Provisional application No. 62/833,209, filed on Apr. 12, 2019.

(51) Int. Cl.
*G08G 1/04* (2006.01)
*G01J 5/00* (2022.01)
(Continued)

(52) U.S. Cl.
CPC .............. *H04N 5/33* (2013.01); *G01J 5/0022* (2013.01); *G01J 5/485* (2022.01); *G01S 11/12* (2013.01);
(Continued)

(58) Field of Classification Search
CPC .. G08G 1/04; G08G 1/052; H04N 5/33; G01J 5/00; G02S 11/00
See application file for complete search history.

(56) References Cited

U.S. PATENT DOCUMENTS 5,995,900 A 11/1999 Hsiao et al.
6,268,883 B1 * 7/2001 Zehnder .................. H04N 5/33
348/E5.09

(Continued)

FOREIGN PATENT DOCUMENTS

| CN | 201947367 A | 8/2011 |
| CN | 102169019 B | 11/2014 |
| CN | 104657748 A | 5/2015 |

OTHER PUBLICATIONS

International Search Report mailed Aug. 7, 2020.

*Primary Examiner* — Tan Q Nguyen
(74) *Attorney, Agent, or Firm* — Thomas Horstemeyer, LLP

(57) ABSTRACT

The present disclosure relates to systems and methods for passive infrared sensing and detection of vehicular traffic. Vehicle parameters are detected using thermal detection states of pixels of an infrared array sensor. The vehicle parameters can include a velocity of a vehicle. A vehicle record that includes the vehicle parameters can be provided, (Continued)

for example, by a computing device in connection with the infrared array sensor.

20 Claims, 10 Drawing Sheets

(51) Int. Cl.
| | |
|---|---|
| *G01J 5/48* | (2022.01) |
| *G01S 11/12* | (2006.01) |
| *G06V 10/764* | (2022.01) |
| *G06V 10/82* | (2022.01) |
| *G06V 20/54* | (2022.01) |
| *G08G 1/01* | (2006.01) |
| *G08G 1/015* | (2006.01) |
| *G08G 1/052* | (2006.01) |
| *H04N 5/33* | (2023.01) |
| *G06T 7/246* | (2017.01) |

(52) U.S. Cl.
CPC ............ *G06V 10/764* (2022.01); *G06V 10/82* (2022.01); *G06V 20/54* (2022.01); *G08G 1/0116* (2013.01); *G08G 1/015* (2013.01); *G08G 1/04* (2013.01); *G08G 1/052* (2013.01); *G06T 7/246* (2017.01); *G06T 2207/10048* (2013.01); *G06T 2207/20084* (2013.01); *G06T 2207/30236* (2013.01)

(56) References Cited

U.S. PATENT DOCUMENTS

| | | | |
|---|---|---|---|
| 9,607,220 B1 * | 3/2017 | Smith | .................... G06V 20/62 |
| 2013/0214166 A1 * | 8/2013 | Barlow | ................... G01S 11/12 |
| | | | 250/342 |
| 2014/0112537 A1 * | 4/2014 | Frank | ..................... G01N 21/17 |
| | | | 315/149 |
| 2017/0169299 A1 * | 6/2017 | Huang | ................. G06V 10/761 |

* cited by examiner

PASSIVE INFRARED SENSING AND DETECTION FOR TRAFFIC

CROSS-REFERENCE TO RELATED APPLICATIONS

This application claims priority to and the benefit of all the following applications, and is the 35 U.S.C. § 371 national stage application of PCT Application No. PCT/US2020/027159, filed Apr. 8, 2020, where the PCT claims priority to and the benefit of U.S. Provisional Application No. 62/833,209, filed Apr. 12, 2019, all of which are hereby incorporated herein by reference in their entireties.

BACKGROUND

Roadways are an important part of transportation infrastructure, serving as a backbone to enable better mobility for people and goods. Despite the increasing traffic volumes, there is a lack of signalized intersections, active signage, and sustainable power especially in rural areas. This can cause major crashes and fatalities. Rural roads account for a large percentage of the nation's road miles and vehicle miles traveled. Rural roads and intersections account for 54% of fatalities, which is 2.4 times greater than the fatality rate in urban areas. Despite lower populations, rural economies are dependent on well-maintained and reliable transportation systems. Many rural towns have high speed limit (e.g., 70 mph) roadways in their communities. In light of the declining resources and the need for active signage and warning systems, it is a challenge to develop innovative smart technologies for monitoring the roadways and collecting traffic data with low cost and low power consumption for usage on roadways, including rural roadways where these concerns are more pronounced.

Traffic sensing technology can be divided into on-roadway and off-roadway systems depending on where the sensor is installed to monitor the traffic flow. On-roadway detection systems, such as: magnetic loop, magnetometers, inductive loops, pneumatic road tubes, and piezoelectric vehicle detection technologies have high detection accuracy but their disadvantages include: high installation cost, high maintenance, short lifetime due to physical contact, and potential for failure in poor road conditions. Due to these issues, on-roadway detection systems are not suited for rural environments. Video image processing systems, microwave radar, and infrared sensors are off-road detectors that are mounted above the roadway or alongside the roadway and provide the capability to monitor a target area. These technologies have disadvantages including high power consumption and high cost.

The need for further sensing and detection technology is made more acute with the future growth of autonomous or self-driving vehicles and the spread of vehicle-to-infrastructure (V2I) communications that will improve roadway safety and reduce accidents. This technology can provide the backbone of an autonomous intelligent transportation system.

SUMMARY

Disclosed are various embodiments of the present disclosure that involve passive infrared sensing and detection for traffic. Some embodiments involve a system for infrared sensing and detection. The system can include a computing device, a data store, and an infrared array sensor comprising pixels arranged in a plurality of columns. The respective columns can include a number of the pixels. The data store can include executable instructions that cause the computing device to perform actions for sensing and detection. For example, a vehicle parameter or multiple vehicle parameters can be identified or determined based on localized thermal emissions detected by the infrared sensor array. At least one vehicle parameter can be determined. In some cases, a velocity of a vehicle can be determined. Additionally or alternatively, any set of one or more vehicle parameters including a length, height, volume, vehicle count, and vehicle classification can be determined. A vehicle record can include the comprising the at least one vehicle parameter.

Additional embodiments involve a method for infrared sensing and detection. The method can include detecting at least one vehicle parameter based at least in part on changes in thermal detection states of pixels of an infrared array sensor. The at least one vehicle parameter can include any set of one or more vehicle parameters including a length, height, volume, vehicle count, and vehicle classification. A computing device electronically connected to the infrared array sensor can provide a vehicle record that includes the at least one vehicle parameter.

BRIEF DESCRIPTION OF THE DRAWINGS

Many aspects of the present disclosure are better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure generally relates to systems and methods for passive infrared sensing and detection of vehicular traffic. As outlined above, a low cost, low power, real-time traffic data collection traffic sensing device is needed to collect traffic data in remote rural areas for planning and future development. Such a device could also be used in low power sensor networks as the vehicle detection and traffic parameter collection portion of the system. The present disclosure describes innovative techniques. Some techniques use a single passive infrared sensor array to develop a sensing device to detect passing vehicles and estimate traffic state parameters. Multiple sets of algorithms were developed to enable this type of sensor to detect, calculate velocity, and determine the classification of passing vehicles by their thermal signatures.

Figure 1:
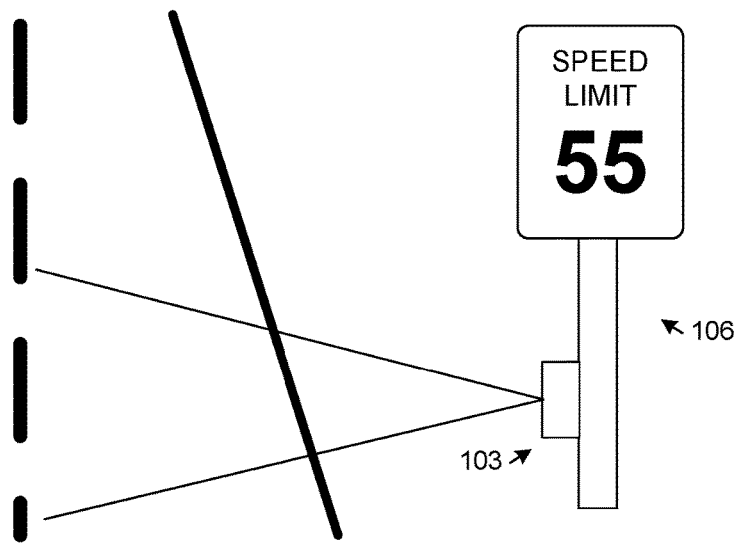
FIG. 1 illustrates an example of an infrared sensing and detection system according to the present disclosure.

As shown in FIG. 1, the systems described can include a traffic sensing device 103 designed to be an off-pavement vehicle detection system capable of being installed on pre-existing or standard infrastructure 106, such as a speed limit sign, a light post, or a warning sign. The traffic sensing device 103 can be off-pavement system, which can be installed without impeding traffic, can include lower installation cost of the traffic sensing device 103, and is unlikely to be damaged by roadwork.

Figure 2:
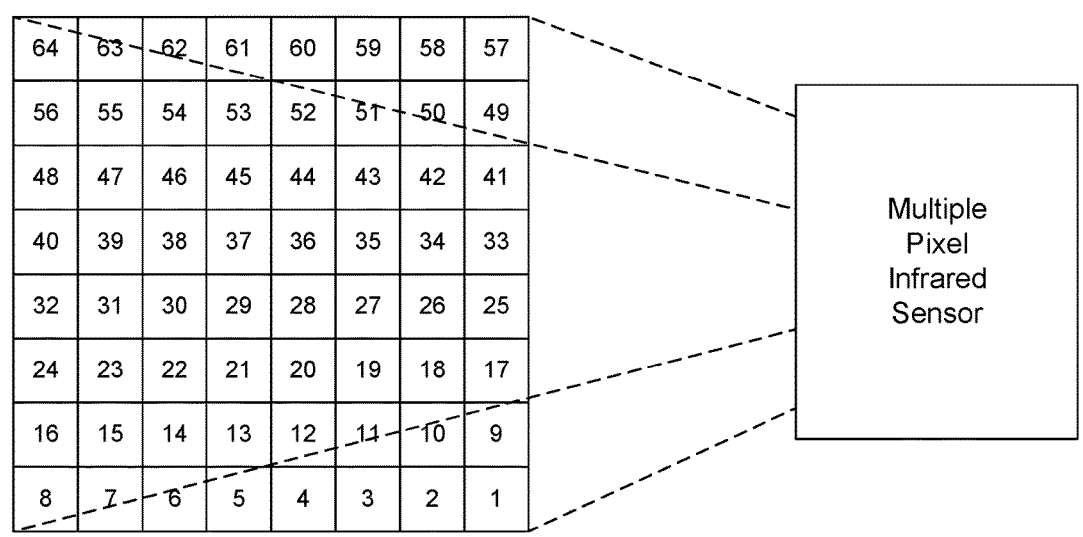
FIG. 2 illustrates an example array sensor for infrared sensing and detection according to the present disclosure.

As shown in FIG. 2, the type of sensor that is used in the traffic sensing device can include a multiple-pixel passive infrared sensor 200 or infrared array sensor. The multiple-pixel passive infrared sensor 200 can have a low power consumption, large field of view, and the ability to collect a wide range of data while protecting privacy of motorists. As disclosed herein, multiple sets of algorithms can be utilized to enable this type of sensor to detect vehicles, calculate vehicle velocity, and determine the vehicle classification of passing vehicles based on their thermal signatures.

Moving back to FIG. 1, the traffic sensing device 103 can detect vehicle parameters and store them in a data store of the device. The traffic sensing device 103 can monitor roadways including a two-lane, two-way rural roadway, and other roadways. The traffic sensing device 103 can be mounted to pre-existing roadway infrastructure (e.g., signage, light post) at a particular height (e.g., 2 ft.) above the roadway and a particular distance (e.g., 12 ft.) from the edge of the roadway. Other orientations in greater or lesser height above the roadway, greater or lesser distances from the edge of the roadway. The traffic sensing device 103 can include passive pixel infrared array sensor or other multiple-pixel passive infrared sensor 200 positioned so the center of the viewing angle is perpendicular to the roadway. This can allow the thermal intensity of a passing vehicle to be substantially uniform across all pixels in the array. The sensor can have a tilt of 0° and can be positioned so that the thermal energy of the passing vehicles is within a column of the pixel array sensor, for example, substantially in the center of the column of the pixel array sensor. In some embodiments, a different viewing angle with respect to the horizontal or vertical can be used.

The purpose of the traffic sensing device 103 being positioned to view the passing vehicles from a horizontal perspective is to allow the sensor to have a side view of vehicles instead of previously used top views of passing vehicles. This side view can allow existing traffic control signage to be utilized therefore reducing cost of the sensor module installation. In addition, vehicle parameters can be identified from this position, such as height, length, velocity, thermal signature, and other parameters. This can improve the accuracy of vehicle classification detection.

The traffic sensing device 103 and/or the multiple-pixel passive infrared sensor 200 can include a computing device with one or more processor, one or more data store, and program instructions executable by the processor. The computing device can include a processor-based circuit or system such as a microcontroller system, a computer system, or a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components. The data store can include any storage device or medium that can contain, store, or maintain the instructions, logic, or applications described herein for use by or in connection with the traffic sensing device 103. The data store can include any one of many physical media, such as magnetic, optical, or semiconductor media. More specific examples include solid-state drives or flash memory. The multiple-pixel passive infrared sensor 200 can include a passive pixel infrared array sensor, such as the Panasonic Grid-Eye® Infrared Array Sensor. Traffic sensing device 103 can include a network device that can communicate over a personal area network (PAN), local area network (LAN), or wide area network (WAN) device. A network device for a PAN can be wired, such as a USB or FireWire device, or wireless, such as an infrared device, ZigBee device, Bluetooth device, or ultrawideband (UWB) device. Wireless network devices can also include WiFi devices, cellular communication devices, and other devices. Bluetooth and other wireless communications can connect to a smart phone or other client device 1234 application, such as DSPS Bluetooth App for Smart phones, or Grid-Eye Evaluation Kit PC Software. A Radio frequency (RF) transceiver such as the nrf24l01 transceiver can be used in some situations.

The traffic sensing device 103 can be programmed with executable instructions through development environments such as the Atmel Development Environment, Arduino Development Environment, and others. The multiple-pixel passive infrared sensor 200 can include an array of pixel sensors with any number of rows and columns, such as 4×4, 6×6, 8×8, 12×12, 16×16, and so on. The number of rows can also be different from the number of columns, such as 8 columns and 6 rows, or any other arrangement. In the present disclosure, the sensor is described as an 8×8 pixel infrared array sensor, but any arrangement can be used through the principles described herein. The multiple-pixel passive infrared sensor 200 can also include a particular viewing angle for measuring temperature data with a particular viewing angle, such as a 60° viewing angle. The multiple-pixel passive infrared sensor 200 can have a sample rate, such as 10 Hz, 20 Hz, or another sampling rate or frequency. For example, a sampling rate or frequency high enough to resolve the smallest vehicle (or vehicle classification) with more than three pixels.

During a startup or initialization process, a master timer can be configured with a particular frequency (e.g., 10 Hz) that is used in the vehicle velocity and length calculations. A queue can be designed with a 3×64 size array to store three states of the 64 pixel's temperature values, or another number of states can be stored. A 2×64 Boolean array was created to store the detection status of each pixel for two states. A 3×64 size array can be created to store the average temperature value of each pixel for three states. A size 2×8 array can be created to store the detection status of each column for two states. A size 2×8 array can be created to store the time the thermal signature was first detected and last detected in each of the eight columns.

During the initialization process, the average pixel temperature state array can be initialized with the temperature of 65° Celsius, or another selected temperature. With this initial startup temperature, it can take the system approximately 4 s to reach steady state depending on the temperature of the roadway. The startup temperature can be selected to be larger than the warmest observed or expected roadway temperature, for example, based on a field test or historical data. This can ensure that there are no false detections during the time it takes the system to reach steady state. Also, all the detection status arrays can be initialized with Boolean false values (i.e., negative) and the time detection arrays can be initialized with a value of zero. After the initialization process, the pixels temperature measurements (x[n]) can be acquired, for example, through an I2C interface and stored into a state array for further processing and analysis.

Figure 3A:
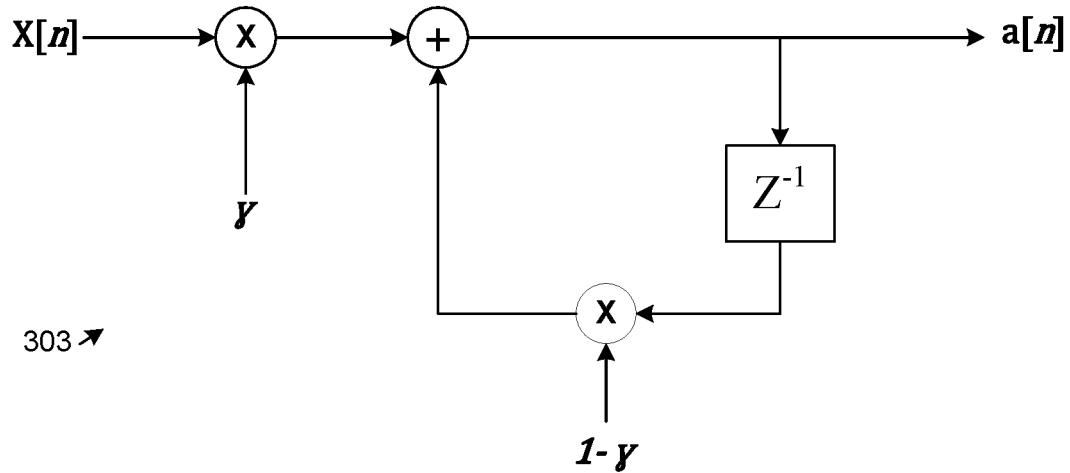
FIGS. 3A and 3B illustrate examples of filters utilized in infrared sensing and detection according to the present disclosure.

As illustrated in FIG. 3A, a filter 303, for example, a first order infinite impulse response (IIR) filter or other type of filter can be utilized for initialization or centering. The input signal can be centered on zero so that thermal signatures can be identified regardless of the ambient temperature. To center the temperature data on zero, (c[n]) the current calculated average temperature of the pixel (a[n]) can be subtracted from the previous measured or observed temperature (x[n−1]) (see Equation 1). Using the previous measured temperature value in the calculation can delay a detection of a thermal signature by a tenth of a second, but allows a lower threshold value to be used increasing the detection accuracy and distance.

$$c[n] = x[n-1] - a[n] \quad (1)$$

The IIR filter can be applied to all pixels (e.g., all 64 pixels in an 8×8 sensor array) to find the pixel average (Equation 2). The IIR filter coefficient (γ) can be selected to allow the pixel average to respond quickly to fluctuations of temperature but not too quickly where a passing vehicle would raise the pixel average high enough that a subsequent vehicle would not be detected.

$$a[n] = \gamma * x[n] + (1-\gamma) * a[n-1] \quad (2)$$

To determine the appropriate IIR filter coefficients, the filter can be tested during different times of the day and with different temperatures of the roadway. During partly overcast days when cloud cover that blocked the sun moves to expose the sun, the observed pixel temperatures can increase since the IR energy from the sun is exposed. During this event the pixels average temperature can respond quickly, so if a vehicle passes the sensor it will be detected. In some cases, γ=0.15.

Figure 3B:
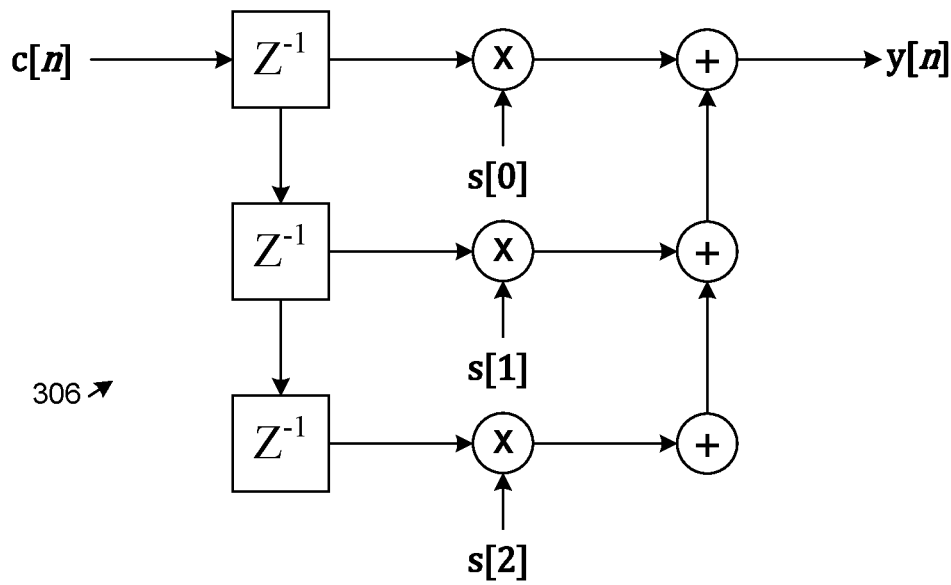

As illustrated in FIG. 3B, a filter 306, such as a finite impulse response (FIR) filter or other type of filter can be utilized for detection. The reason of applying the FIR filter to each pixel in search of a detection, instead of applying the FIR filter to each row or each column of the pixel array, is to reduce false detection. For example, this can reduce the chances that hot spots in areas of the pixel array will cause false detections. This can also allow the direction of the thermal signature to be identified, the velocity of the thermal signatures to be calculated, and allows pixels in different locations of the array to experience different temperature fluctuations. The signal ([n]) can be multiplied by the centered temperature data in search of a detection. Due to the sampling rate of the sensor the FIR filter is applied over three states (Equation 3). The output of the FIR filter ([n]) can then be run into a decision algorithm to determine if a thermal signature is detected for that pixel.

$$y[n] = \sum_{n=0}^{2} s[n]c[n] \quad (3)$$

In some cases, s[n]=[0.80, 0.10, 0.05]. The output of the decision algorithm can be determined by whether the output of the FIR filter is greater than or equal to the detection threshold ($d_p$) for that pixel (Equation 4). The Boolean output of the decision algorithm ([n]) can be stored in the detection array.

$$d[n] = \begin{cases} 0, & \text{if } y[n] < d_p \\ 1, & \text{if } y[n] \geq d_p \end{cases} \quad (4)$$

Since different areas of the sensor experience different fluctuations in temperatures, pixels in the array require different detection thresholds.

Figure 4:
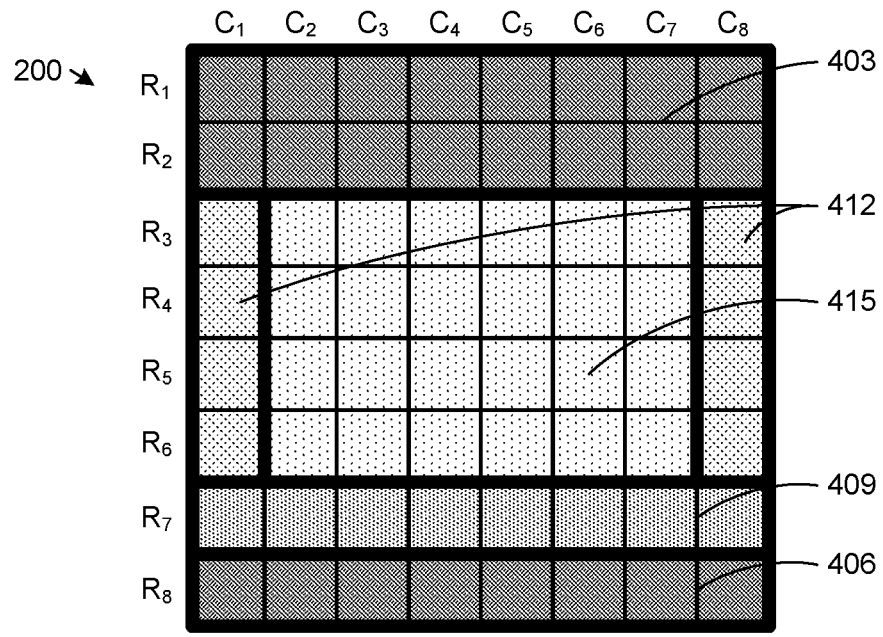
FIG. 4 illustrates example detection areas of an array sensor for infrared sensing and detection according to the present disclosure.

As illustrated in FIG. 4, the multiple-pixel passive infrared sensor 200 can have its pixels assigned to pixel areas 403, 406, 409, 412, and 415. Each of the pixel areas can be associated with its own detection threshold in order to account for the areas in the pixel array where a vehicle is most likely to be detected, thus reducing the possibility of a false detection.

TABLE 2

| Detection Thresholds | |
| --- | --- |
| Detection Threshold | Value |
| Threshold 1 | 1.6 |
| Threshold 2 | 1.4 |
| Threshold 3 | 1.35 |
| Threshold 4 | 1.25 |
| Threshold 5 | 1.15 |

The top rows 1 and 2 can be assigned to pixel area 403 (detection threshold 1), which can use the highest detection threshold since the lack of background with cooler temperatures can cause large temperature fluctuations and incorrect temperature measurements. Omission of these rows is not optimal since larger or taller vehicles (e.g., class four and five) can be detected in these rows. The bottom row 8 can be assigned to pixel area 406 (detection threshold 2). Row 7 can be assigned to pixel area 409 (detection threshold 3). Rows 7 and 8 can experience high temperature fluctuations due to the absorbed energy from the sun during the day, for example, on the ground or roadway. Pixel area 412 (detection threshold 4) can include the side pixels (Columns 1 and 8) from Rows 3 through 6. Pixel area 412 can experience medium temperature fluctuations since they are on the edge of the pixel array. The pixel area 415 (Threshold 5) can have the lowest detection threshold because that is where a vehicle is most likely to be detected and this area can experience relatively low fluctuations in measured temperature values.

Figure 5:
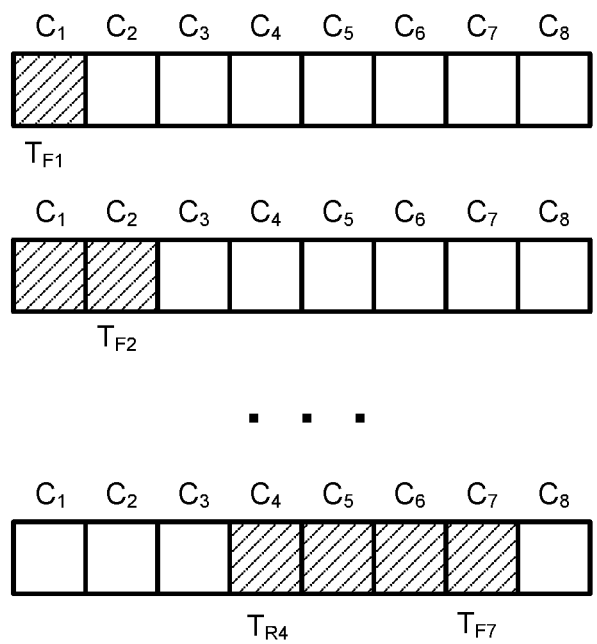
FIG. 5 illustrates an example of speed detection according to the present disclosure.

FIG. 5 shows an example of how the traffic sensing device 103 can measure velocity. The velocity is a key parameter that is measured by the traffic sensing device 103 and can be used to calculate the length of the vehicle for the vehicle classification detection purposes, in some aspects. Once the FIR filter is applied to every pixel, the pixel detection array can be traversed in search of a detection in individual pixels, rows, and columns. An individual pixel state array, row state array, and column state array can be maintained. A pixel state array can include Boolean detection states for respective pixels along with timestamps for each state, a row state array can include Boolean detection states for respective rows along with respective timestamps for each state, and a column state array can include Boolean detection states for respective columns along with respective timestamps for each state. A length can be chosen such that a predetermined number of states are stored. In other cases, the length of each array can be increased as each new state is identified. In the example shown in FIG. 5, the sensor array can include pixels that are in columns one through eight. Depending on the detection status of the column, the status column detection state one array can be updated. The time of the thermal signature detection can also be recorded. In this example, the detected object can be moving from left to right.

To calculate the velocity of the thermal signature, the time difference of arrival of the thermal event between two columns can be measured. The column detection array is traversed and when a front thermal detection occurs in that column, then the time from the master timer is recorded. A front thermal detection for a column is signaled when the current column detection array state value is positive (Boolean true) and the previous state value is negative (Boolean false). When a detection state changes from negative to positive, this can be considered a front detection, or a detection of a front of a travelling vehicle, and time can be recorded. Time $T_{F1}$ can refer to a time of front detection in column 1, $T_{F2}$ can be a time of front detection in column 2, and $T_{F7}$ can be a time of front detection in column 7. On the other hand, when a detection state changes from positive to negative, this can be considered a rear detection, or a detection of a rear of the travelling vehicle, and time can be recorded. For example, time $T_{R4}$ can refer to a time of rear detection in column 4. A difference between front detection times for different columns (or alternatively a difference between two rear detection times) can be used so that the velocity calculation does not depend on the length of the vehicle. A timeout function can be used to ensure that an object has not been detected for too long and if an object has been detected for the timeout period, then the column time array values are all reset to zero.

While the detections can be applied to columns to identify a vehicle velocity, row detections and individual pixel detections can be likewise identified. A top thermal detection can be identified based on the uppermost pixel that is activated (Boolean true) by a travelling vehicle is identified residing in the particular row. A bottom thermal detection for a row can be identified when the lowermost pixel that is activated (Boolean true) by a travelling vehicle is identified as residing in another row. The row values can be subtracted to identify a vehicle height. In some examples, a vehicle volume can be determined by multiplying this vehicle height by the vehicle length and a predetermined width. A width can generally be selected as a value less than or equal to the lane width. In some cases, a vehicle width can be selected based on the length of the vehicle, or based on a vehicle classification once identified as discussed herein. For example, the length and height of a vehicle can be provided as inputs to a machine learning algorithm such as a neural network, the vehicle classification can be identified, and a predetermined width associated with the vehicle classification can be used in calculations to determine the vehicle volume. Additional factors can be utilized, for example, as vehicles can be shapes other than perfect rectangular prisms. The vehicle volume can be identified based on an average number of pixels that are activated as the travelling vehicle passes the traffic detection device 103.

Figure 6:
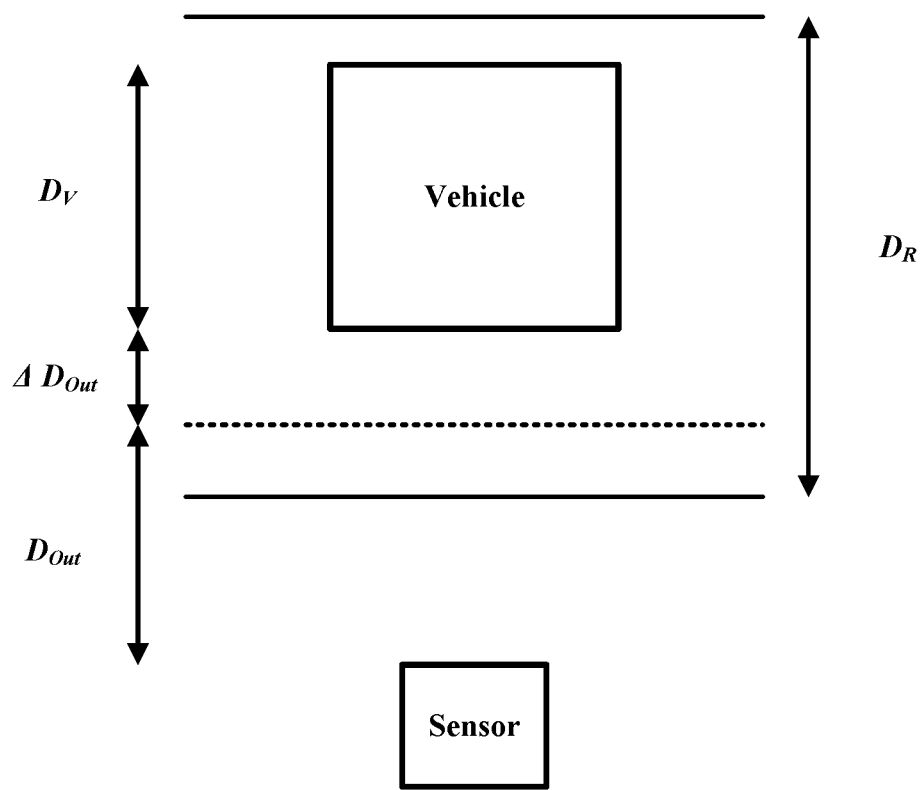
FIG. 6 illustrates an example of dimensions used in calculations for infrared sensing and detection according to the present disclosure.
Figure 6:
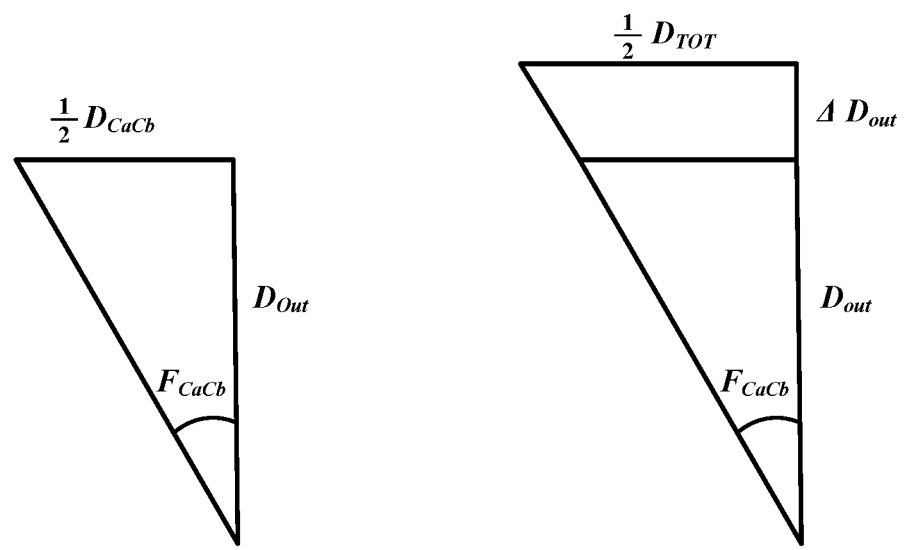

As illustrated in FIG. 6 and discussed below, the distance between the columns of the sensor ($D_{CaCb}$) can be determined by using trigonometry with the azimuth plane angle between the field of view of the columns ($F_{CaCb}$) and with the distance between the sensor and the detection line ($D_{Out}$). The field of view between column 1 and column 8, column 2 and column 7, and column 3 and column 6 can be acquired from a datasheet for the multiple-pixel passive infrared sensor 200 of FIG. 2. As can be understood, the field of view between individual columns, including between column 1 and each of the other respective rows 2-8; between column 2 and other respective rows 1, and 3-8, and so on, can be determined or identified from a datasheet for the multiple-pixel passive infrared sensor 200. Also, the height and length of each pixel, height of each row, and length of each column can be determined. As a result, a length and/or height can be associated with each pixel detection, including row and column detections, respectively. An average column length can be identified, and in some cases applied to a respective column. An average row height can be identified, and in some cases applied to a respective row.

These values can be hard- or soft-coded into a function in the initialization process to calculate the distance between the columns (Equation 5).

$$D_{CaCb} = 2 * D_{Out} * \tan F_{CaCb}°  \quad (5)$$

The velocity of the passing thermal signature can be used for traffic parameters and to calculate the length of the passing thermal signature of the vehicle. Once the vehicle exits the sensor's field of view, the velocity from column "a" ($T_{Ca}$) to column "b" ($T_{Cb}$) is related to the time difference ($\Delta T_{CaCb}$), $$\Delta T_{C_a C_b} = T_{C_b} - T_{C_a} \quad (6)$$

The velocity ($V_{CaCb}$) in Equation 7 can be calculated as the distance between column "a" and column "b" (Equation 5) divided by the time difference $\Delta T_{CaCb}$ (Equation 6), $$V_{C_a C_b} = \frac{D_{C_a C_b}}{\Delta T_{C_a C_b}} \quad (7)$$

The velocity of the thermal signature ($V_{TS}$) can be found by averaging multiple column velocity calculations. For example, the average of three column velocity calculations is shown in Equation 8.

$$V_{TS} = \frac{1}{3}\left(\frac{D_{C_1 C_8}}{\Delta T_{C_1 C_8}} + \frac{D_{C_2 C_7}}{\Delta T_{C_2 C_7}} + \frac{D_{C_3 C_6}}{\Delta T_{3 C_6}}\right) \quad (8)$$

Throughout the velocity calculation it can be confirmed that columns one through four record a time before columns five through eight. This can ensure that a vehicle enters the field of view from the left to the right, meaning that the vehicle is in the targeted lane closest to the sensor. If the vehicle enters the field of view from the right to the left, then the vehicle is in the far lane (opposite direction) and the velocity will not be calculated.

Aa vehicle may not be in the center of its lane, causing variations in distance from the sensor to the vehicle ($\Delta D_{Out}$).

This can affect the velocity calculation of the thermal signature, thus affecting the vehicle classification.

Therefore, a generalized equation can be used to solve for the variations in speed due to the variation in distance. The distance ($D_{Ref}$) that the sensor can view the vehicle without variations in $D_{Out}$ can be determined.

$$D_{REF} = 2 * D_{Out} * \tan\theta \quad (9)$$

The total distance ($D_{TOT}$) that the sensor can view the vehicle with variations in $D_{Out}$ can also be determined.

$$D_{TOT} = 2 * (D_{Out} + \Delta D_{Out}) * \tan\theta \quad (10)$$

The third step can be to find the time ($S_{TS}$) that the sensor will detect the thermal signature with variations in $D_{Out}$.

$$S_{TS} = \frac{D_{TOT}}{V_{Ref}} \quad (11)$$

And then find the calculated heat signature velocity ($V_{TS}$) with a variation in the $D_{Out}$ distance.

$$V_{TS} = \frac{D_{Ref}}{S_{TS}} \quad (12)$$

Combining equations 9-12 and simplifying:

$$V_{TS} = \frac{D_{Ref} * V_{Ref}}{D_{TOT}} \quad (13)$$

$$V_{TS} = \frac{2 * D_{Out} * \tan\theta * V_{Ref}}{2 * (D_{Out} + \Delta D_{Out}) * \tan\theta}$$

Equation 14 determines the variation of the calculated velocity ($\Delta V_{TS}$) based on the variations in detection distance as follows, $$\Delta V_{TS} = \frac{D_{Out} * V_{Ref}}{D_{Out} + \Delta D_{Out}} - V_{Ref} \quad (14)$$

$$\Delta V_{HS} = V_{HS} - V_{Ref} = \frac{D_{Out} * V_{Ref}}{D_{Out} + \Delta D_{Out}} - V_{Ref}$$

Where $D_{Out}$ is the distance from the sensor to the vehicle detection line, $\Delta D_{Out}$ is the variations in distance from the vehicle to the detection line, and $V_{Ref}$ is the actual speed of the vehicle.

For this calculation, parameters such as a vehicle width of 6 ft. and lane width of 12 ft. can be used. The vehicle detection line can be set at the edge of the shoulder with a detection distance of 6 ft. and that the vehicle is traveling at 30 mph. With these variables, there is a possibility the vehicle appears in a 6 ft. range in the roadway potentially causing a velocity calculation error of 20 mph. Other parameters can also be used, based on the specific application or roadway in which the device is to be used.

One option can be to set the detection line from the outer wheel path where a vehicle is most likely to drive at in the traveling lane. A large amount of data can be collected to determine where this distance is located on a roadway and that this detection line distance will vary from roadway to roadway. One solution is to identify highest areas of wear on the roadway to estimate the location of the wheel path and then set the detection line in the middle of the worn area. This can reduce the error resulting from the distance variations between the vehicle and the sensor.

Another solution can be to move the sensor farther away from the road, but the detection rate will decrease since less heat can be detected by the sensor at greater distances. The heat signature's velocity can be calculated with the generalized formula that is derived above. From the calculations, the speed error range can, in some examples, be reduced from a 20 mph down to a 10 mph range. From the calculations, the speed error range can also be reduced from a 10 mph down to a 5 mph range. A potential issue with moving the sensor further away from the detection area is that the thermal intensity of the signal can be reduced. There are also some positive aspects of moving the sensor further away, such as a relatively low 10 Hz sampling rate of a sensor can take more samples of the vehicle. Also, some pre-existing infrastructure can be positioned 12 ft. from the roadway, so new infrastructure may not have to be installed, and the sensor will view a larger area.

The raw temperature measurements of the multi-pixel infrared sensor 200 can also use further processing to estimate the traffic state parameters. For example, a neural network can be designed to use both the height and the length of the vehicle's thermal signature to determine the classification of the vehicle.

The vertical distance between the rows of the sensor can be likewise determined by using trigonometry with the azimuth plane angle between the field of view of the rows and with the distance between the sensor and the detection line. The field of view between individual rows, including between row 1 and each of the other respective rows 2-8; between row 2 and other respective rows 1, and 3-8, and so on, can be determined or identified from a datasheet for the multiple-pixel passive infrared sensor 200.

Figure 7:
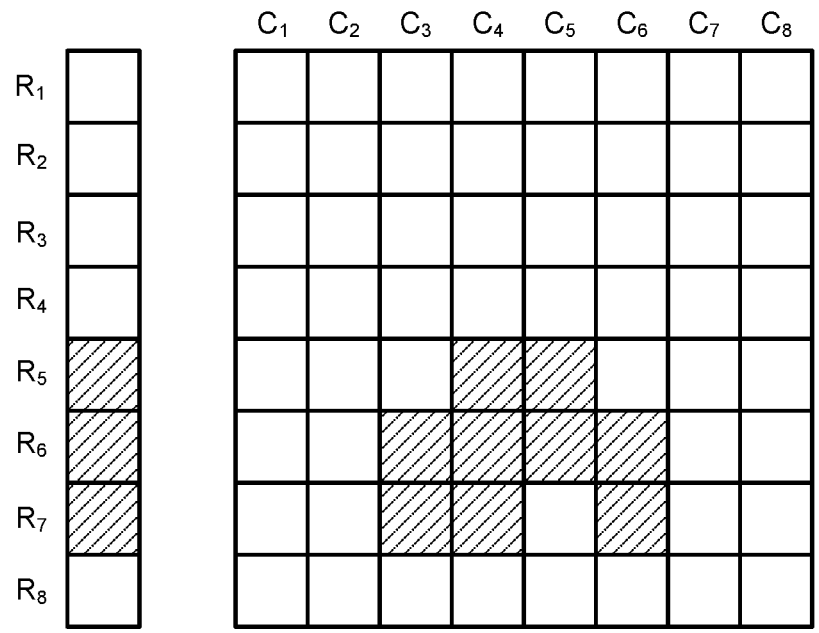
FIG. 7 illustrates an example of height detection according to the present disclosure.

As illustrated in FIG. 7, the height of the vehicle thermal signature can be measured or calculated. Different classes of vehicles can be identified based on the measured height of the vehicle thermal signature. When a vehicle is detected in the Boolean detection array, the number of detections in the column can be observed. The maximum number of pixel detections in a column can be recorded. The height can be determined based on the number of rows or pixels detected in a column. In some cases, the maximum for each column can be recorded and averaged to determine the height of the vehicle. The height for a row can be determined using a method analogous to that described above regarding distance between columns. The maximum (or average) detected height of the thermal signature can be used as an input of the neural network.

Likewise, when a vehicle is detected in the Boolean detection array, the number of detections in a row can be observed. The maximum number of pixel detections in a row can be recorded. The length of the vehicle can be determined based on the number of columns or pixels detected in a row. In some cases, the maximum for each row can be recorded and averaged to determine the length of the vehicle. The length of a row can be determined using a method analogous to that described above regarding distance between rows. The maximum (or average) detected length of the thermal signature can be another input to the neural network.

Figure 8:
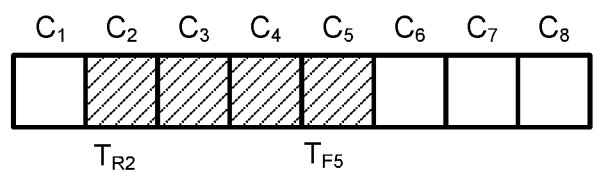
FIG. 8 illustrates an example of speed and length detection according to the present disclosure.
Figure 8:
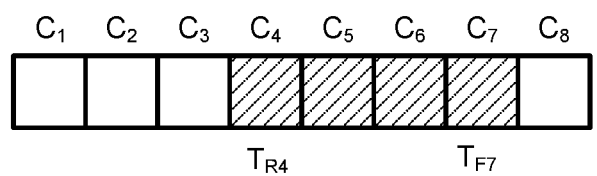

FIG. 8 shows one example of a calculation of the length of the thermal signature. As indicated above, the length can also be an input into the vehicle classification neural network. The time the front of the vehicles is detected in a column, which can be the same time used in the velocity calculation, can be used along with the time the rear of the vehicle is detected in that column. The time the rear is detected can be when the current state of the column detection array value is false and the previous state values is true. The difference between time the front of the vehicles is detected in the column and the time the rear of the vehicle is detected in that column can be used to calculate the total time that the thermal signature was observed in the column.

The middle columns, for example, columns three through six can be monitored for this since they are the most sensitive. The time the front of the vehicle is detected ($T_{F_a}$) can be subtracted from the time the rear of the vehicle is detected ($T_{R_a}$) to give the total time the vehicle was detected in the column ($\Delta T_{D_a}$).

$$\Delta T_{D_a} = T_{R_a} - T_{F_a} \tag{15}$$

To calculate the length of the thermal signature ($L_{C_a}$), the time the thermal signature was detected in the column can be multiplied by the velocity of the thermal signature to give the length of the signature for that column (Equation 16).

$$L_{C_a} = \Delta T_{D_a} * V_{TS} \tag{16}$$

The four calculated lengths of the vehicle can then be averaged together to receive the thermal signature length ($L_{TS}$).

$$L_{TS} = \frac{1}{4}\sum_{k=1}^{4} L_{C_n} \tag{17}$$

Figure 9:
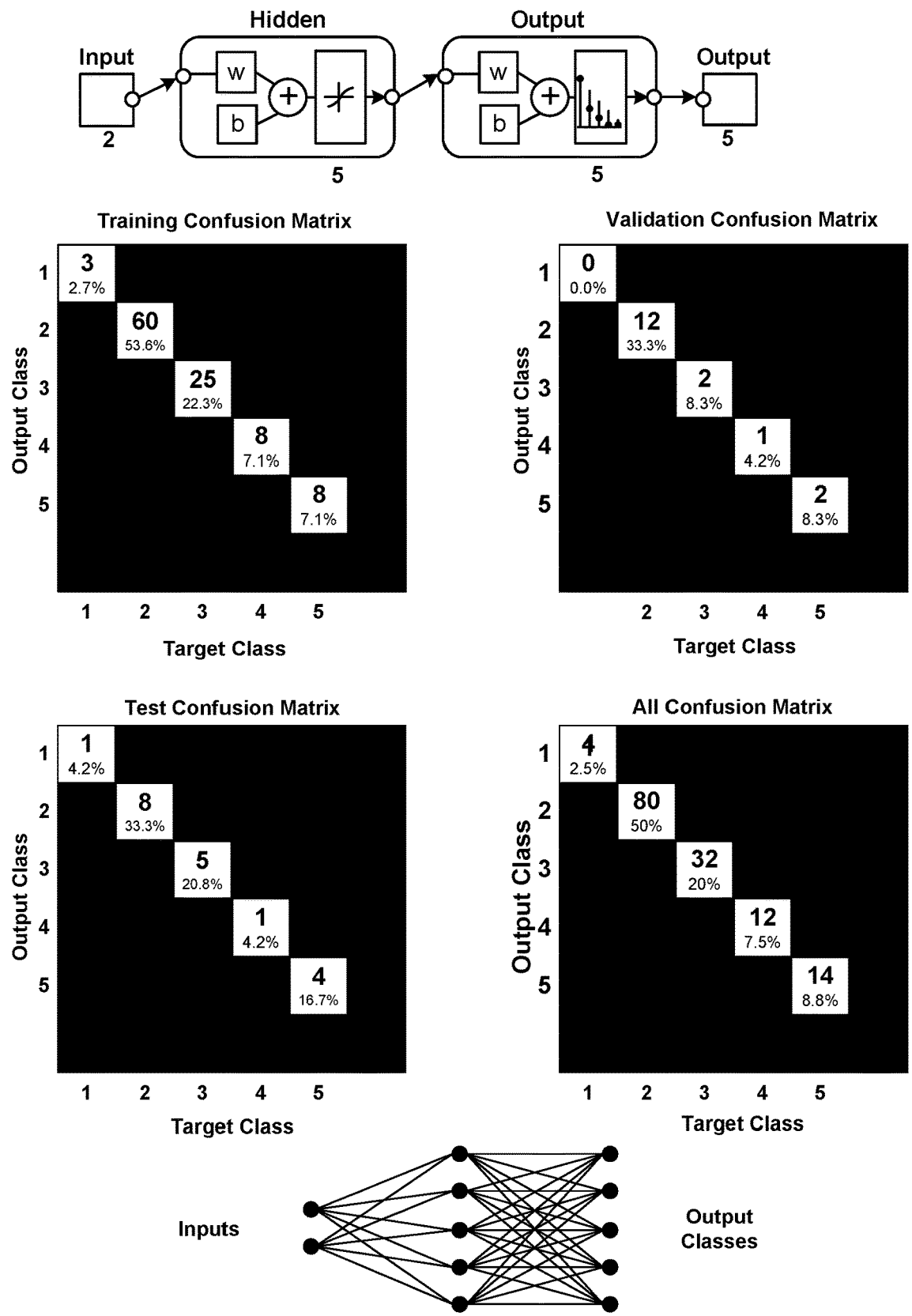
FIG. 9 illustrates an example operation for vehicle classification and training according to the present disclosure.

As illustrated in FIG. 9, a neural network can be trained and utilized for vehicle classification. In order to develop the neural network, the type of vehicle classes can be defined so data can be collected by the sensors to train the neural network. The vehicles types can be classified as follows: class 1 is motorcycles, class 2 is sedans, small trucks, and small SUVs, class 3 is trucks, large SUV, and vans, class 4 is busses and box trucks, and class 5 is semi-trucks. These classifications can be based on the similarity of thermal signatures from observed tests, measurements of the height and the length of the thermal signatures from earlier processes, and the Federal Highway Administration's vehicle classification. The classes can be developed based on the types of vehicles observed during field test and more classes could be developed, such as the classes the federal highway administration has, with access to locations with high occurrences of these classes of vehicles.

Training data can be collected on a roadway such as an urban roadway. Urban roadways can be used due to the high traffic flow allowing for more training data to be collected in a shorter time frame. The data can be recorded in a text file, a markup language (e.g., XML) file, or another data structure. Text files can be useful in order to allow the data to be uploaded directly into MATLAB and other software packages for processing. Two sets of data can be developed from observing the roadway with the first set of data being the training data set, where outliers are removed in an effort to minimize classification errors, and the second data set can be the observation of passing vehicles over multiple days with different atmospheric conditions. The device can be trained to classify vehicles by machine learning. For example, a first data set can be used to train a machine learning algorithm such as a neural network. The second data can be used after the neural network was developed and trained, to classify vehicles using the neural network.

A two-layer feed-forward neural network, with sigmoid (or other types) hidden neurons and SoftMax (or other types) output neurons can be used to classify the passing vehicles thermal signature because of its pattern recognition ability, ability to generalize data, and ability to respond to unexpected inputs. Furthermore, the structure of the neural network includes two inputs, five outputs, and a hidden layer of five neurons (See FIG. 9). Two inputs of the neural network can be the height and the length of the vehicle thermal signature. The particular neural network is described for the purposes of providing a concrete example. However, other neural networks that include additional inputs, such as vehicle velocity and time of detection, and other parameters associated with the vehicle detection can be used. In addition, fewer or additional layers can be utilized. Convoluted and recursive neural network can be utilized. Activation functions of the hidden neurons and output neurons can also be altered. For examples, a combination of hyperbolic tangent activation functions, arc tangent activation functions, sigmoid activation functions, tansig activation functions, SoftMax activation functions, linear activation functions, and non-linear activation functions can be utilized for respective hidden neurons and output neurons.

The hidden layer number of neurons can be selected as any value. In some cases, five neurons can be used, as this value can produce similar results as a hidden layer of ten neurons and it requires less computational power to classify the vehicles than the ten-neuron hidden layer. The neural network can be created, trained, visualized, and simulated based on the collected data. Once the network is designed, it can be broken down into a series of arrays and functions to allow the neural network to be incorporated into other languages, such as the C programming language, to classify vehicles by their thermal signatures. Before the data is applied to the neural network, the data can be preprocessed using the function in Equation 18. The function can normalize the input of neural network to ensure the data is in a specified range of −1 to 1 to prevent the transfer function from becoming saturated. The $x_{min}$ and $x_{max}$ can be from the neural network training data while the $y_{min}$ and $y_{max}$ can come from the tansig transfer function used in the neural network.

$$y(n) = \frac{(n - x_{min})(y_{max} - y_{min})}{(x_{max} - x_{min})} + y_{min} \tag{18}$$

$$x_{min} = \begin{bmatrix} 0.5 \\ 1 \end{bmatrix}$$

$$x_{max} = \begin{bmatrix} 17.93 \\ 7 \end{bmatrix}$$

$$y_{min} = -1$$

$$y_{max} = 1$$

The normalized inputs can then be multiplied by the input weights, added to the input node bias, and applied to the tansig function to receive the output of the input layer as $a_1$ (Equation 19).

$$a_1 = \tan sig(IW * p + b_1) \tag{19}$$

$$IW = \begin{bmatrix} 1.7295 & 1.9737 \\ -3.8238 & -0.2670 \\ 3.1892 & -3.4925 \\ -4.3506 & -0.5367 \\ 3.6331 & 1.4630 \end{bmatrix}$$

$$b_1 = \begin{bmatrix} -3.4955 \\ 0.2224 \\ 0.4566 \\ -1.3728 \\ 3.2121 \end{bmatrix}$$

The tansig function can calculate a layer's output from its net input. The tansig function can be approximately mathematically equivalent to hyperbolic tangent, but can be performed faster in some implementations.

$$\tan sig(n) = \frac{2}{1+e^{-2n}} - 1 \tag{20}$$

The $a_1$ output can then be multiplied by the hidden layer weights, added to the hidden layer bias conditions, and then run through the SoftMax function (Equation 21).

$$a_2 = softmax(LW * a_1 + b_2) \tag{21}$$

$$LW = \begin{bmatrix} 0.5350 & 0.4939 & -2.2811 & 1.1487 & -3.1230 \\ -0.1542 & -0.3100 & 2.5375 & 3.4090 & -2.7593 \\ -0.0232 & 1.1409 & -0.5766 & 1.2562 & 2.7629 \\ 0.2206 & 1.3869 & -1.8447 & -3.7400 & 1.6735 \\ 0.2699 & -2.2977 & -0.0384 & -3.9390 & 1.2659 \end{bmatrix}$$

$$b_2 = \begin{bmatrix} -0.0551 \\ -1.5324 \\ -0.2223 \\ 0.3438 \\ -0.1597 \end{bmatrix}$$

The SoftMax function can classify the probability of the output of each neuron being the correct vehicle classification. The SoftMax function can takes an input vector of a set of numbers, and normalize the vector it into a probability distribution over predicted output classes, for example, using a set of probabilities proportional to the exponentials of the input set of numbers.

$$\sigma(n) = \frac{e^{zj}}{\sum_{k=1}^{5} e^{zk}} \tag{22}$$

After the vehicle has been classified, all the column detection arrays can be set to false and the arrays that record time can be set to zero to prepare the system for the next detection.

A linked list can be created to store the velocity and classification of each detected vehicle. After all the data has been collected from the earlier processes, it is stored in a memory using a linked list data structure to be received later by the end user. For example, it can be transmitted over a cellular network, or power can be saved by retrieving or collecting the data from a closer range. A user can connect to the device via Bluetooth or another PAN or LAN connection to retrieve data such as a vehicle record using an application such as DSPS smartphone app. Data of the traffic parameters resets every 7 days.

Figure 10:
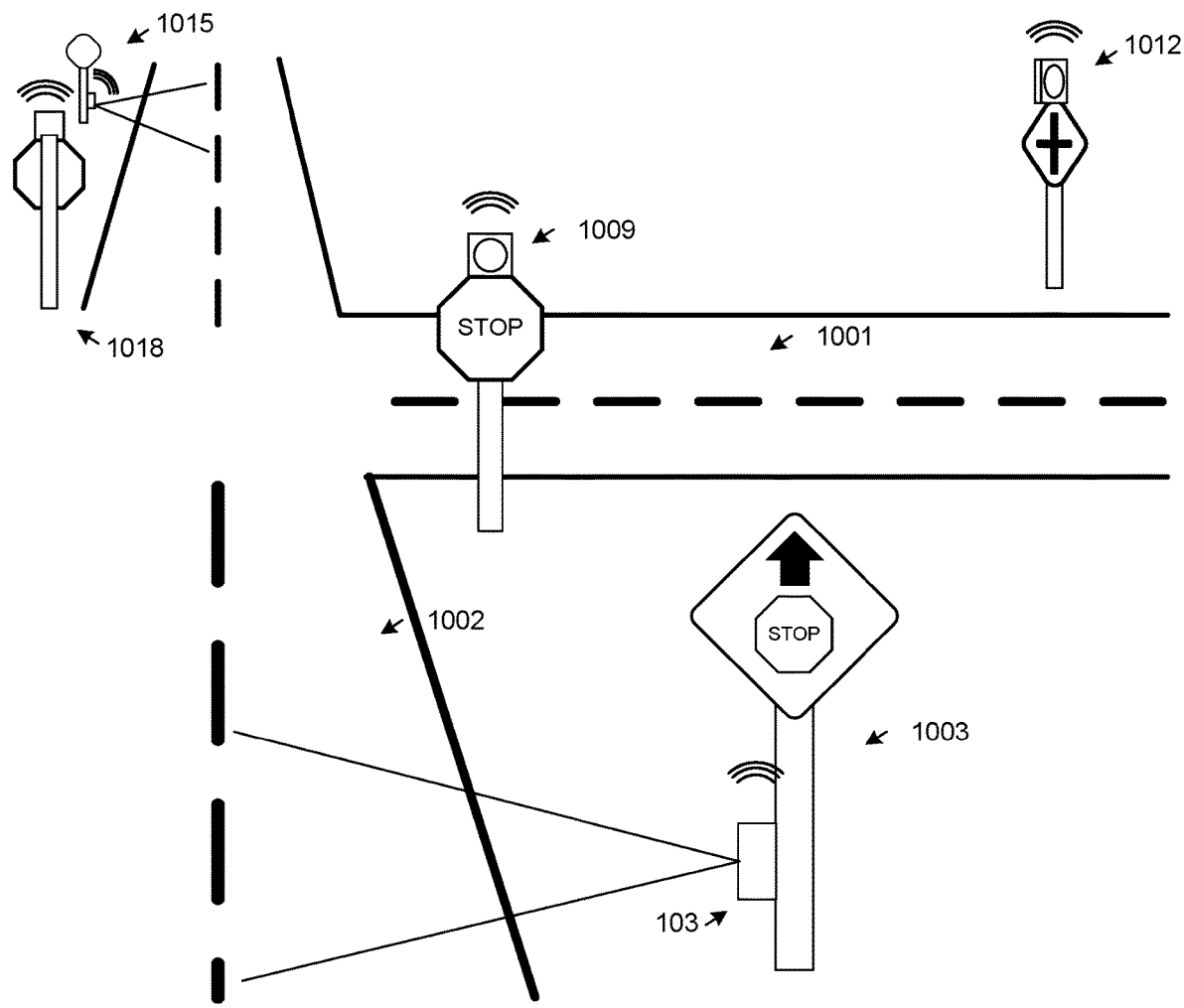
FIG. 10 illustrates an example configuration of an infrared sensing and detection system that includes warning devices, according to the present disclosure.

As shown in FIG. 10, the real-time traffic data collection sensing module can be further developed to create a warning network that warns motorist of potential dangers. Traffic control devices for rural areas can lack vehicle detection systems and can depend on alerting motorist to these traffic control devices by passive methods or by utilizing active signage only during peak traffic hours or by having constant active signage. The issue with these methods is that valuable power is wasted as there are times throughout the day that motorist are not alerted to the signage with active methods, and continuously flashing the beacon can cause the sign to become "background noise" to motorists who view the sign multiple times since the signage is always active. The traffic sensing device 103 can alert the motorists of the traffic control device when a vehicle is in the scope of the traffic control network, implicating that the signage will be active when a vehicle is present, and the motorist, is in view of the signage. By flashing the beacon only when it is visible to the motorist it not only conserves power but is also more likely to draw the motorist's attention to the traffic control device encouraging the motorist to obey the device. Also, having the active signage only when necessary reduces the risk of the sign becoming a distraction and doing more harm than good. The system can be operational 24 hours of the day 7 days a week. This can be done since the system can consume relatively low power compared to other sensing methods, and the system can be activated specifically when a vehicle is detected.

As shown in FIG. 10, the traffic sensing device 103 can wirelessly communicate with a warning device 1009, positioned on the same roadway as the traffic sensing device 103. The warning device 1009 can be a stop warning device positioned on a stop sign a particular distance from the traffic sensing device 103 in the direction of vehicular travel. The warning device 1009 can include a computing device that can execute program instructions and can also include a warning light beacon device and a wireless receiver that can communicate with and receive signals from the traffic sensing device 103 and other sensing devices. The warning light beacon device can be a flashing light. A stop warning device 1009 can include any color light beacon, but a red light can be appropriate for signaling vehicles to stop. A warning device can include warning lights, a beacon, LED (or other) Pavement Markers, Signs with built in LEDs or other built-in lighting.

A major roadway 1001 can intersect with a minor roadway 1002. The minor roadway is considered minor (and the major roadway is considered major) primarily because vehicles on the minor roadway must stop at the intersection, while vehicles on the major roadway do not stop at the intersection. In this roadway configuration, a motorist on the minor roadway 1002 will be required to arrive at a complete stop and then proceed to enter the intersection once it is safe to do so. The traffic sensing device 103 can be placed on a stop ahead sign 1003, and a stop warning device 1009 can be placed on a stop sign. When the traffic sensing device 103 detects a vehicle, a signal, as described in the below in transmission setup section, can be transmitted to stop warning device 1009 to activate the warning beacon light. A warning device 1009 can be positioned on any pre-existing infrastructure where traffic incidents are possible and data collection is desired.

In this configuration, in addition to warning a motorist on the minor roadway to stop at the intersection, the traffic sensing device 103 can also warn traffic on the major roadway that there is a vehicle approaching, so the major roadway motorists can be more cautious as well. To this end, the traffic sensing device 103 can transmit a signal to the stop warning device 1009 and a signal to one or more caution warning devices 1012 in each direction for the crossing major roadway 1001. The warning device 1012 can be similar to the warning device 1009. However, where mounted on a major roadway that does not stop, yellow or orange warning beacon lighting may be appropriate. The signal can be a single signal for all devices, or can be separate signals for each device. The respective (or single) signal can cause the device(s) 1009 and/or 1012 to activate their warning beacon lighting for a particular period of time. In some cases, the period of time can be determined based on the speed or velocity calculated for the vehicle, and the distance from the traffic sensing device 103 to the intersection. In some examples, the time can be calculated to consider vehicle deceleration to the stop sign. Much like the traffic sensing device 103, a traffic sensing device 1015 can detect a vehicle and can transmit a signal to the stop warning device 1018 on the minor roadway 1002, as well as caution warning device(s) 1012 for each direction of travel on the major roadway 1001.

Figure 11:
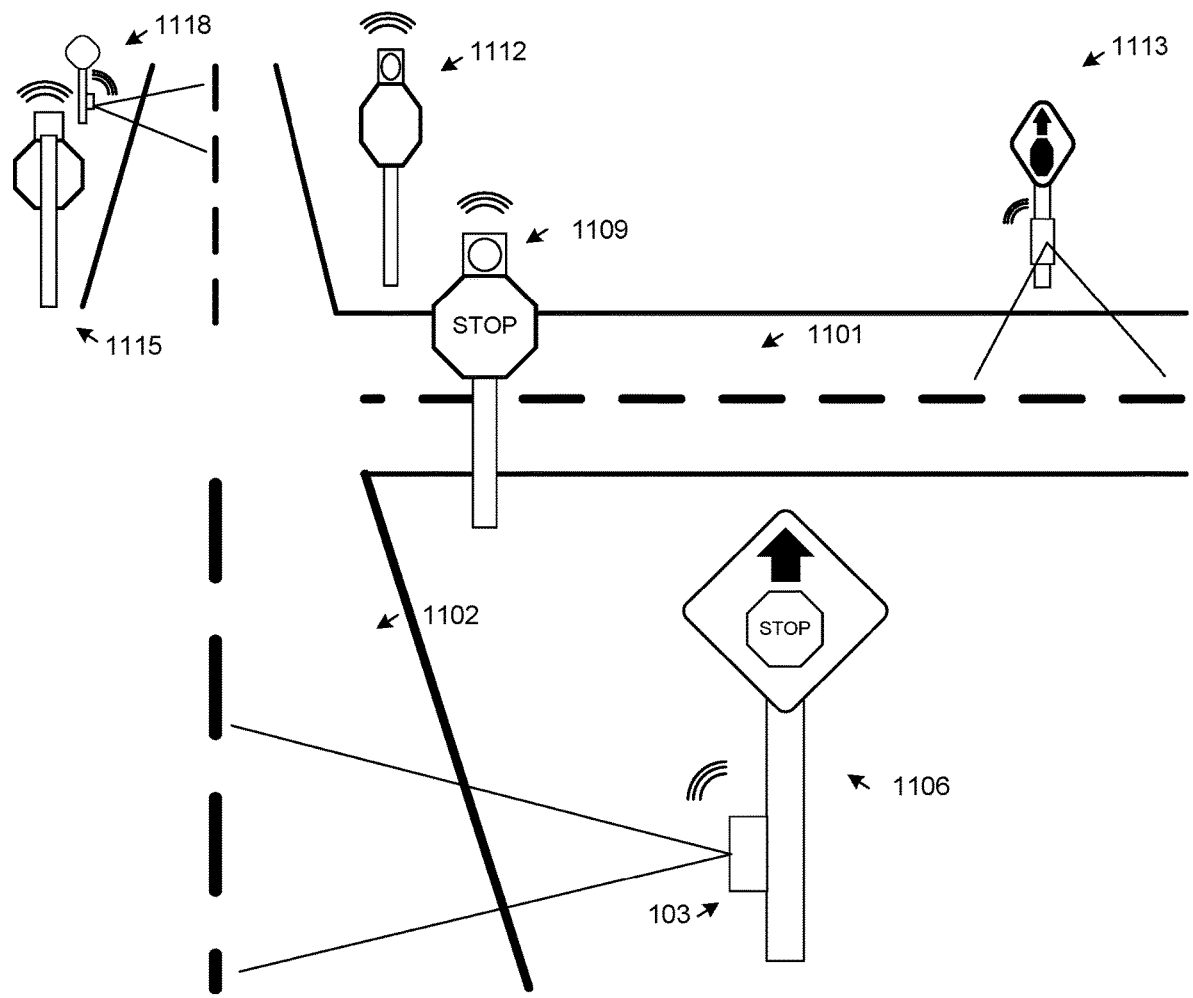
FIG. 11 illustrates another example configuration of an infrared sensing and detection system that includes warning devices, according to the present disclosure.

FIG. 11 shows another traffic sensing device 103 configuration for a four way stop. This figure includes a traffic sensing device 103 and a stop warning device 1109 a particular distance from the traffic sensing device in the direction of travel on the roadway 1102. A stop warning device 1112 is positioned particular distance from a traffic sensing device 1113 in the direction of travel on the roadway 1101. A stop warning device 1115 is positioned particular distance from a traffic sensing device 1118 in the direction of travel on the roadway 1102. While not shown, a fourth traffic sensing device and stop warning device can be positioned for the opposite direction of travel on the roadway 1101.

In each case, the traffic sensing device(s), once a vehicle is detected, can determine a velocity of the vehicle and can generate and transmit a signal to the corresponding stop warning device that is located a distance ahead in the direction of travel of the vehicle. The signal can cause the stop warning device to activate a flashing beacon for a specified period of time based on the velocity that is determined. In addition, in some cases, the signal (or a separate signal for each device) can be transmitted to each of the stop warning signals on the crossing roadway. For example, the traffic sensing device 1113 can, in some cases, only activate the stop warning device 1109. However, in other cases, the traffic sensing device 1113 can further activate both of the stop warning signals 1109 and 1115. This can warn undetected vehicles, or undetected pedestrian traffic, that a vehicle is approaching on the crossing roadway.

The traffic sensing device(s) (and warning device(s)) can be powered by respective solar panels that charge a respective battery or power storage device. In some cases, thermoelectric generator device, for example, embedded in a roadway, can be used to power the devices and charge the battery. Where available, grid power can be used.

A traffic sensing device 103 can be housed within a plastic case. The case can include a viewing hole that is sized to allow the infrared sensor to view the vehicles. The size of the viewing hole can be determined by the field of view of the sensor and the distance the sensor is from the side of the housing. The viewing hole of the multiple-pixel passive infrared sensor 200 can be as small as possible based on these factors. In some cases, the viewing hole can be a viewing window made of a material that allows the sensor to detect thermal signatures of passing vehicles. To determine the size of the viewing hole, the maximum field of view in degrees is calculated for a canonical hole (Equation 32).

The traffic sensing device 103 (and the warning devices) can include ability to transmit and receive wireless signals, for example, using an RF transceiver. A solar panel can also be utilized to power the devices. As much of the power can be collected over the day time, a battery can be used to store the energy for continuous sensing operation of the system throughout the night. A power converter and battery management system can be utilized to charge the battery with the energy produced by the solar panel and produce an appropriate power supply for the computing devices utilized (e.g., 5V DC, 6V DC, 12V DC, and others). A relay can turn the flashing beacon on based on a signal (e.g., a 3.3V or other voltage produced by the microcontroller or other computing device). A flashing beacon can be used, and can be mounted on pre-existing infrastructure.

An example transmission protocol can be implemented in the warning network to allow multiple subsections to be able to operate and communicate with other subsections to form a larger interconnected system. While this is one example of a transmission protocol, others can be utilized. For this protocol, each node can be assigned with a unique identification number. The purpose of this is to be able for the receiving unit to know that the transmission is designated for that unit, to verify that the node sending the transmission has permission to interact with the receiver node, and that depending on the node sending the transmission a different action may be required. The transmission protocol can include identification number of the transmission unit, the identification number of the unit that is meant to receive the transmission, an action identification (e.g. a number or other identifier), and a payload.

When a vehicle is detected by the traffic sensing device 103 and the velocity is calculated, a transmission message is generated. The message is comprised of the following things in this order: the identification number of the detection unit, the identification number of the warning unit, 0 to clarify that the warning beacon is intended to make the sign active, and the active time duration of the signage. After the message is assembled, the message is sent and then the thermal signature is analyzed for the traffic parameters so that valuable time is not wasted. If the transmission is intended to go to multiple warning modules, then a new message is created for each warning module.

Example Transmission Structure:
1. Identification number of the node the transmission is intended for
2. Identification number of the node the transmission is to be sent from
3. Type of message:
    a. Active Beacon Signal (e.g., 0)
    b. Traffic Parameter Data (e.g., 1)
    c. Other
4. Payload:
    a. Active Signage Time Duration (e.g., for Active Beacon)
    b. Vehicle Detection Information (e.g., for Traffic Parameter Data)
    c. Other.

When a warning device receives a transmission, it can confirm that the received message is intended for the particular warning device. After confirmation, the device can verify that the sensing device sending the message is permitted to send messages to this warning device. If either of those are violated, then the warning device can ignore the received transmission. If the message is permitted, the warning device can identify a task to perform. If the type of message instructs the warning device to activate signage such as a warning beacon light, then the warning device will process the payload, which can include the active time duration based on the vehicle velocity, and can activate the flashing beacon for the appropriate amount of time.

A traffic sensing device 103 can include a multiple-pixel passive infrared sensor 200 (e.g., a multiple-pixel passive infrared sensor 200 of an evaluation kit such as the Grid-Eye Evaluation Kit), a computing device such as an Arduino Due, a transceiver, a solar panel, a battery, and a power converter. The purpose of the transmitting device is to detect a passing vehicle, calculate time duration to activate the signage, form the transmission message according to the transmission protocol described above, transmit message, and record traffic parameters for future analysis.

In some cases, detection of the vehicle and the velocity calculation of the vehicle is used for activating the warning device (e.g., on a stop sign or intersection sign, or other signage). The traffic parameters received from the methods earlier described can be used to create an adaptable and effective warning network. The warning device can be activated while it is visible to the motorist, and shut off thereafter. This can reduce the amount of power required to be used. To do this, a dynamic amount of time can be calculated based on how long the signage is visible to the vehicle. This can be determined by the velocity of the vehicle. The active duration can be a conservative calculation to account for vehicles that begin to decelerate as they approach an intersection.

For example, one example calculation can assume that the motorist begins to decelerate the vehicle at the warning sign (see, e.g., element 1003 of FIG. 10). The vehicle can arrive at a complete stop at the stop sign of the warning device 1009. The calculation can be performed for a vehicle with constant deceleration. The kinematic equation 23 can be used to calculate the time for the beacon to be activated.

$$t = \frac{zd}{(V_i \div V_f)} \quad (23)$$

The variable d in the equation can be the distance from the stop ahead sign to the stop sign which can be according to laws or regulations, or can be measured for the application. $V_f$ in the equation can be 0 mph since it is assumed that the vehicle will arrive at a complete stop at the stop sign. Vi in the kinematic equation can be the calculated velocity of the passing vehicle in miles per hour from the sensing and detection module. These variables are added into the equation along with the conversion from miles per hour to feet to second to account for the input speed. Also, a velocity correction variable is not accounted for since this is a conservative calculation and can account for more time than what it will take the vehicle to reach a complete stop.

An enclosure of the traffic sensing device 103 can have a covered area that allows infrared waves to enter the module to allow the sensor to monitor the roadway. The enclosure can be constructed out of plastic to allow RF communications to be utilized within the design. The enclosure can contain all components of the traffic sensing device 103 to allow for quick and easy installation. The enclosure can be constructed to require little to no maintenance over its estimated 10-year lifetime. The enclosure can have an IR-transparent window that allows the multiple-pixel passive infrared sensor 200 to view the passing vehicles and not allow water to enter the module.

The power consumption of the traffic sensing device 103 can be found by adding the power consumption of the components of the traffic sensing device 103 per hour. For example, adding the power of the Grid-Eye Evaluation Kit or other multiple-pixel passive infrared sensor 200 ($P_{GE}$), the power consumption of the Ardunio Due or other computing device ($P_{AD}$), and the power of the transceiver ($P_T$), then multiplying that by the 24 hours the module will be operating. To calculate the size of the solar panel the voltage of the solar panel ($V_{SP}$) is multiplied by the current the traffic sensing device 103 consumes ($A_{DM}$) and is divided by the number of 1000 Wh the designated location receives ($H_{SUN}$) and the efficiency of the conversion/storage system ($E_C$). To calculate the amp hour size of the battery ($P_B$) the number of days the system should run on a full charge ($D_R$) can be multiplied by the power consumption of the traffic sensing device 103 ($P_{DM}$) and is divided by the minimum percentage the battery can be drained to before being damaged ($L_B$).

The warning device can receive a transmission from a traffic sensing device 103 and then alert the motorist to potential dangers with active signage. The warning device can include, for example, an Arduino Nano or other computing device, nrf24l01 Transceiver or other transceiver or wireless communications device, a solar panel, a battery, a power converter, and flashing beacon.

Once the warning device receives the transmission from the traffic sensing device 103, the warning device can verify the transmission as stated in the transmission protocol section and store the time duration received from the payload. The beacon can be operated at a 50% duty cycle, or any cycle according to applicable roadway laws and regulations. Where the duty cycle of the beacon is 50%, the beacon alternates being lit every 0.5 s. Because of this the time that is received must be rounded up to the nearest half second. Rounding up ensures that the active signage will be visible to the motorist until the motorist passes the signage. After the time the signage should be active is calculated, interrupts can be used to flash the beacon at the 50% duty cycle until the remaining time reaches 0 s. If the warning module receives another transmission to activate the signage while the signage is still active, the warning device can determine the additional time to add to the activation time to ensure the signage will be active for the newly detected vehicle.

To calculate the amount of energy the flashing beacon consumes per day ($P_{TAB}$), the power consumption per second of the active beacon (PAB) by the time the vehicle is expected to be detected by the average daily traffic for the roadway. The power consumption of the receiving module ($P_{RM}$) the Arduino Nano ($P_N$) power consumption is added to the transceiver power consumption ($P_T$) and then multiplied by the 24 hours the module will be operating. The total power consumption of the warning module ($P_{WM}$) can be equal to the power consumption of receiving module and the amount of energy the flashing beacon consumes per day. To calculate the size of the solar panel the voltage of the solar panel can be multiplied by the current the warning module ($A_{WM}$) consumes and divided by the number of 1000 Wh the designation location receives ($H_{Sun}$). To calculate the amp hour capacity of the battery, the number of days the system should run on a full charged battery ($D_R$) can be multiplied by the power consumption of the warning module ($P_{WM}$) and is divided by the minimum percentage the battery can be drained to before being damaged ($L_B$).

The enclosure can be constructed out of plastic or other material that allows RF communications to be utilized within the design. The enclosure should contain all components of a module to allow for quick and easy installation. The enclosure should be constructed to require little to no maintenance over its estimated 10-year lifetime.

In order to make the system as flexible as possible for deployment and use, the entire system (traffic sensor(s), warning indicator(s), and data collection) can be operated using ambient energy. This can reduce installation and maintenance costs that result from connection to the power grid in remote areas, where it may be miles to the nearest power line. However, where available, grid power can be used if desired.

Solar energy can be utilized as discussed above. Additionally or alternatively, the systems can take heat from the pavement and convert the heat into electricity with a thermoelectric generator. These solid-state devices can be simple and reliable, and can be buried in the ground, making them less susceptible to damage.

A thermal energy harvesting system, can include the thermal system, the power conversion system, and the energy storage system. The thermal system can include parts that connect the thermoelectric generator (TEG) to the hot and cold energy sinks in a way that minimizes temperature drops (loss of heat). The power conversion system can include a set of electrical devices that step up the low and variable voltage from a TEG to a voltage level that is constant and suitable for storage (e.g., charging a battery). The final component can be the energy storage system, which can be a supercapacitor or battery pack.

Figure 12:
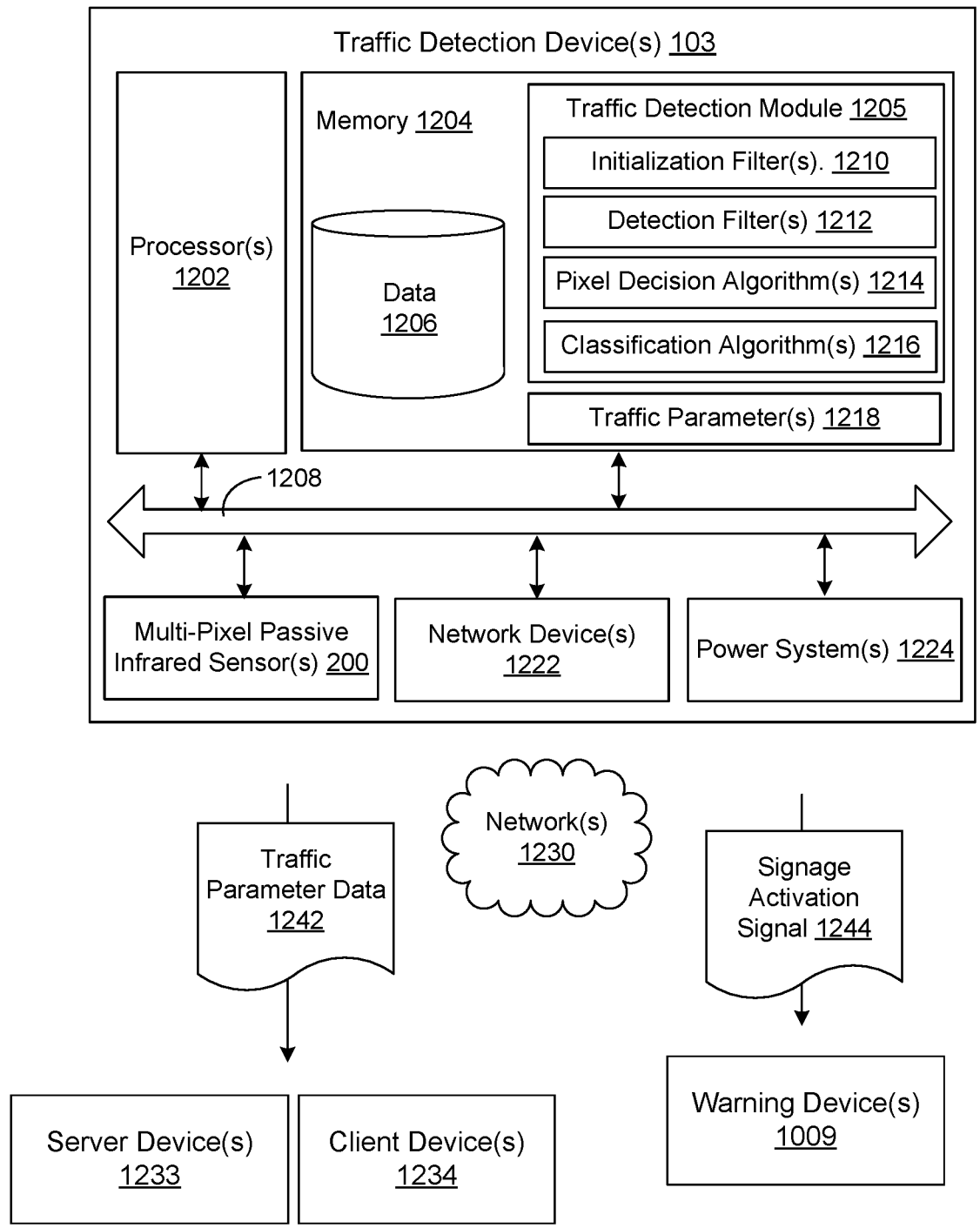
FIG. 12 illustrates various components of an infrared sensing and detection system according to the present disclosure.

With reference to FIG. 12, shown is a traffic detection system, according to various embodiments. The traffic detection system includes a traffic detection device 103, one or more server device 1233, and one ore more warning device 1009. The traffic detection device can communicate with the server device 1233 and the warning device 1009 via one or more networks 1230. The network 152 includes, for example, the Internet, intranets, extranets, wide area networks (WANs), local area networks (LANs), wired networks, wireless networks, cable networks, satellite networks, or other suitable networks, etc., or any combination of two or more such networks.

The traffic detection device 103 can include at least one processing system, for example, having a processor 1202 and a memory 1204, both of which are electrically and communicatively coupled to a local interface 1208. The local interface 1208 can be embodied as a data bus with an accompanying address/control bus or other addressing, control, and/or command lines, for data communications and addressing between the processor 1202, the memory 1204, and the traffic detection module 1205. The traffic detection device 103 can also include a multiple-pixel passive infrared sensor 200, one ore more network device(s) 1222, and one or more power system 1224. The multiple-pixel passive infrared sensor 200 network devices 1222, and power systems 1224 can be separate from or integrated with the computational system of the traffic detection device 103. All or a portion of the memory 1204 can also be separate from or integrated with the computation system of the traffic detection device 103. The multiple-pixel passive infrared sensor 200 network devices 1222, and power systems 1224 can be connected to the local interface 1208. Respective components of the traffic detection device can be powered using the power systems 1224.

The traffic detection module 1205 can include an application or program including instructions executable by the traffic detection device 103 using the processor 1202. The traffic detection module 1205 can include, or otherwise access, data and instructions including one or more initialization filter 1210, one or more detection filter 1212, one or more pixel decision algorithm 1214, one or more classification algorithm 1216. In some examples, the traffic detection module 1205 can include a discrete hardware element of the traffic detection device, and in other cases, can be stored in the memory 1204 and data 1206 for execution. The traffic detection module 1205 can identify and process states of the multiple-pixel passive infrared sensor(s) 200 to determine traffic parameters 1218, and can aggregate the traffic parameters 1218 into traffic parameter data 1242. The traffic parameters 1218 can include the information discussed herein with respect to the various figures, including vehicle length, vehicle height, vehicle volume, vehicle velocity, traffic statistics including a total number and frequency of vehicles passing the traffic detection device 103, and vehicle classifications based on one or more of the vehicle length, vehicle height, vehicle volume, and vehicle velocity.

In some examples, the initialization filter 1210 can be embodied as a hardware or software filter. The initialization filter can include an IIR filter such as a first order IIR filter or another type of filter that can center the pixels of the multiple-pixel passive infrared sensor 200 on zero (or another value) so that thermal signatures can be identified regardless of the ambient temperature. The initialization filter 1210 filter can be applied to the pixels of the multiple-pixel passive infrared sensor 200 to find a pixel average that can respond to fluctuations of temperature while not raising the pixel average high enough that a subsequent vehicle would not be detected.

The detection filter 1212 can be embodied as a hardware or software filter. The detection filter can include a FIR filter or other type of detection filter 1212 for detection. The FIR filter can be applied to a respective pixel rather than to a row or column of pixels, in search of a detection in order to reduce false detection. For example, this can reduce the chances that hot spots in areas of the pixel array will cause false detections. This can also allow the direction of the thermal signature to be identified, the velocity of the thermal signatures to be calculated, and allows pixels in different locations of the array to experience different temperature fluctuations.

The traffic detection module 1205 can utilize a pixel decision algorithms 1214 to identify whether or not a particular pixel has triggered a thermal detection. The results of pixel detections using the pixel decisions algorithms 1214 can include individual pixel detections, column pixel detections, row pixel detections, average number of pixel detections in each row for a vehicle, average number of pixel detections in each column for a vehicle, average number of total pixels activated at a single time for a vehicle, and other detections. Respective pixel detections can be timestamped. This allows vehicle passing time, and a vehicle velocity to be identified. The traffic detection module 1205 can use the pixel detections to identify vehicle length, height, volume, and velocity. The individual pixel detections, as well as vehicle length, height, volume, and velocity can be provided to a classification algorithm 1216 such as a trained neural network or another machine learning algorithm trained to identify vehicle classifications based on the inputs. The classification algorithm 1216 can identify that a vehicle has been detected, as well as its classification. Various records can be stored in the traffic parameters 1218 for a respective vehicle detection, including the vehicle length, height, volume, and velocity on which the classified vehicle is identified. The records can also include a count or total number of vehicles that pass the traffic detection device 103 for a particular period of time. A vehicle frequency can be calculated based on this information, and stored in the traffic parameters 1218.

In various embodiments, the memory 1204 stores data 1206 and other software or executable-code components executable by the processor 1202. The data 1206 can include data related to the operation of the traffic detection system, and other data. Among others, the executable-code components can include components associated with the traffic detection module 1205 and an operating system for execution by the processor 902. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

The memory 1204 stores software for execution by the processor 1202. In this respect, the terms "executable" or "for execution" refer to software forms that can ultimately be run or executed by the processor 1202, whether in source, object, machine, or other form. Examples of executable programs include, for example, a compiled program that can be translated into a machine code format and loaded into a random access portion of the memory 1204 and executed by the processor 1202, source code that can be expressed in an object code format and loaded into a random access portion of the memory 1204 and executed by the processor 1202, or source code that can be interpreted by another executable program to generate instructions in a random access portion of the memory 1204 and executed by the processor 1202, etc.

In various embodiments, the memory 1204 can include both volatile and nonvolatile memory and data storage components. Volatile components are those that do not retain data values upon loss of power. Nonvolatile components are those that retain data upon a loss of power. Thus, the memory 1204 can include, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 1204.

The processor 1202 can be embodied a processor-based circuit or system such as a microcontroller system, a computer system or device, or a circuit or state machine that employs any one of or a combination of technologies, for example, one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the traffic detection module 1205 can represent one or more module or group of code that includes program instructions to implement the specified logical function(s) discussed herein. The program instructions can be embodied in the form of source code that includes human-readable statements written in a programming language or machine code that includes machine instructions recognizable by a suitable execution system, such as a processor in a computer system or other system. Thus, the processor 1202 can be directed by execution of the program instructions to perform certain processes, such as those illustrated in the flowcharts and functionalities described with respect to the various figures herein. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 1202. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The multiple-pixel passive infrared sensor 200 can include a passive pixel infrared array sensor, such as the Panasonic Grid-Eye® Infrared Array Sensor. The type of sensor that is used in the traffic sensing device can include a multiple-pixel passive infrared sensor 200 or infrared array sensor. The multiple-pixel passive infrared sensor 200 can have a low power consumption, large field of view, and the ability to collect a wide range of data while protecting privacy of motorists. The multiple-pixel passive infrared sensor 200 can include an array of pixel sensors with any number of rows and columns, such as 4×4, 6×6, 8×8, 12×12, 16×16, and so on. The number of rows can also be different from the number of columns, such as 8 columns and 6 rows, or any other arrangement. In the present disclosure, the sensor is described as an 8×8 pixel infrared array sensor, but any arrangement can be used through the principles described herein. The multiple-pixel passive infrared sensor 200 can also include a particular viewing angle for measuring temperature data with a particular viewing angle, such as a 60° viewing angle. The multiple-pixel passive infrared sensor 200 can have a sample rate, such as 10 Hz, 20 Hz, or another sampling rate or frequency. For example, a sampling rate or frequency high enough to resolve the smallest vehicle (or vehicle classification) with more than three pixels.

The network devices 1222 can include a personal area network (PAN) device, local area network (LAN) device, or wide area network (WAN) device capable of communication over the various networks 1230. A network device for a PAN can be wired, such as a USB or FireWire device, or wireless, such as an infrared device, ZigBee device, Bluetooth device, or ultrawideband (UWB) device. Wireless network devices can also include WiFi devices, cellular communication devices, and other devices. Bluetooth and other wireless communications can connect to a smart phone or other client device 1234 application, such as DSPS Bluetooth App for Smart phones, or Grid-Eye Evaluation Kit PC Software. A Radio frequency (RF) transceiver such as the nrf24l01 transceiver can be used in some situations.

The power systems 1224 can include one or more of respective power obtaining devices, power conversion devices, a battery or other power storage device, and battery management devices for one or more power sources such as solar power, thermoelectric power, grid power, and others. The power systems 1224 can include a power converter and battery management system to charge a power storage device using the energy produced by the power obtaining device(s), and produce an appropriate power supply for the computing devices utilized (e.g., 5V DC, 6V DC, 12V DC, and others). Power obtaining devices can include solar panels and other solar power devices, grid connection device, thermoelectric power generator devices, and others. The warning devices 1009 can include similar power systems 1224 as described for the traffic detection devices 103.

Server devices 1233 can include a server computer or any other system providing computing capability. Server devices 1233 may employ a plurality of computing devices that may be arranged, for example, in one or more server banks or computer banks or other arrangements. Such computing devices may be located in a single installation or may be distributed among many different geographical locations. For example, server devices 1233 may include a plurality of computing devices that together may comprise a hosted computing resource, a grid computing resource, and/or any other distributed computing arrangement. In some cases, the server devices 1233 may correspond to an elastic computing resource where the allotted capacity of processing, network, storage, or other computing-related resources may vary over time.

The traffic detection device 103 can transmit, to the server device 1233, traffic parameter data 1242 that is identified and collected according to instructions including the traffic detection module 1205. The traffic detection device 103 can transmit this information immediately once detected and identified, periodically with a specified period of time between transmissions, on a schedule where the data is transmitted at one or more specified time, or in response to a command or request for the traffic parameter data 1242 that is received over the networks 1230 (for example, from a server device 1233). The traffic parameter data 1242 can be transmitted using wired or wireless networks as discussed.

The traffic detection device 103 can also provide the traffic parameter data 1242 to a client device 1234 such as a computer device, phone device, handheld device, USB stick, hard drive device, or other portable device. For example, the traffic detection device 103 can include a physical port through which the data can be transferred or otherwise provided. Additionally or alternatively, the traffic detection device 103 can provide this traffic parameter data 1242 to a client device 1234 using any of the personal area network (PAN) device, local area network (LAN) device, or wide area network (WAN) device. In other words, the traffic parameter data 1242 can be transmitted to the client device 1234 using wired or wireless networks as discussed.

The traffic detection device 103 can transmit, to the warning devices 1009, a signage activation signal 1244 in response to predetermined traffic detection triggers as indicated in the traffic detection module 1205. The signage activation signal 1244 can be transmitted using wired or wireless networks as discussed.

Figure 13:
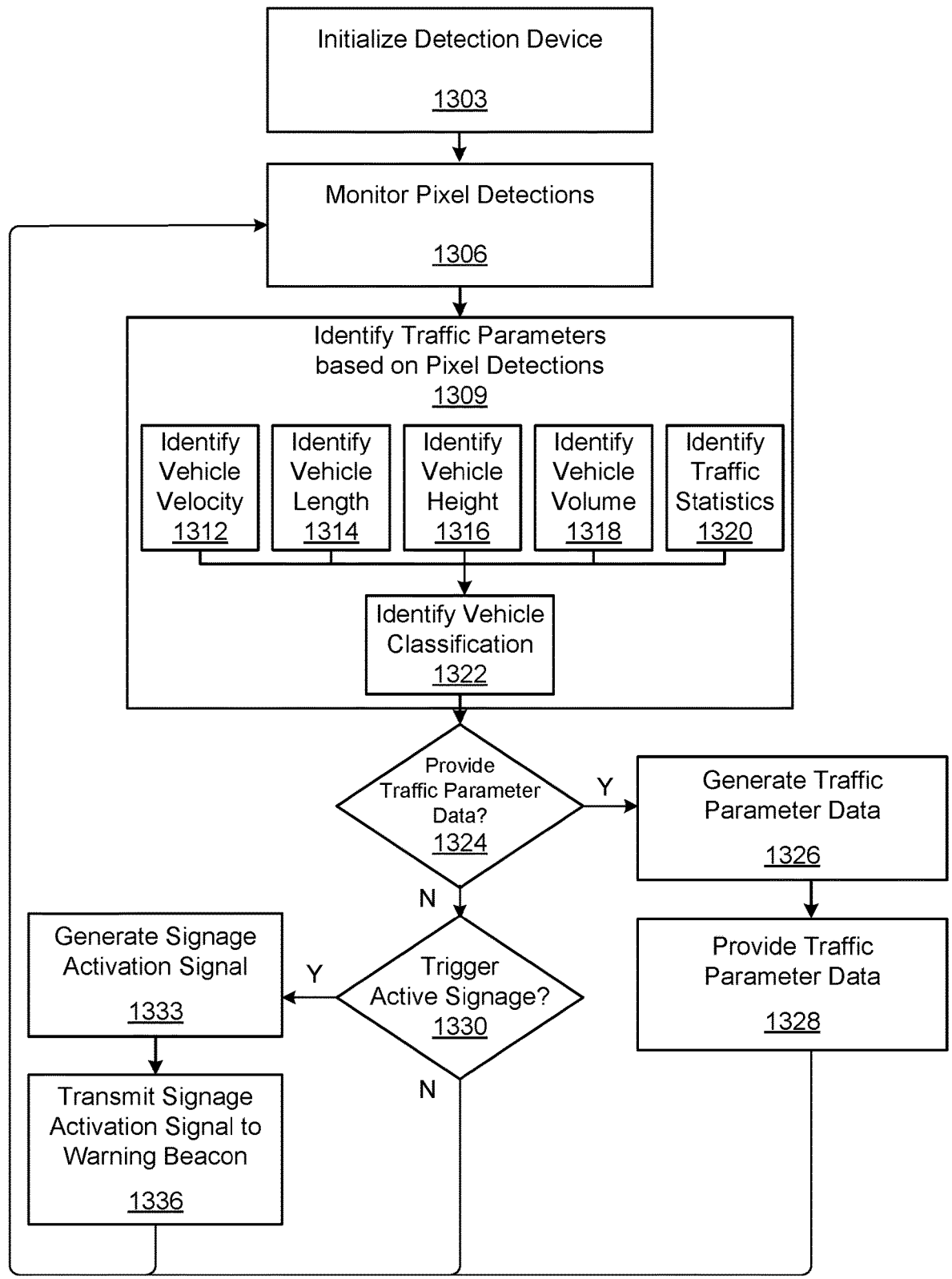
FIG. 13 illustrates an example flowchart describing functionalities performed by an infrared sensing and detection system according to the present disclosure.

FIG. 13 shows a flowchart that can be implemented by the traffic detection device 103. For example, the traffic detection device 103 can execute instructions comprising the traffic detection module 1205. While described with respect to the traffic detection device 103, actions and processes implemented by other components of a traffic detection system are also described.

In step 1303, the traffic detection module 1205 can initialize the traffic detection device 103. The traffic detection module 1205 can implement an initialization process for the various components of the traffic detection device 103. During the startup or initialization process, a master timer of the traffic detection device 103 can be configured with a particular frequency (e.g., 10 Hz) that can be used in the vehicle velocity and some example length and velocity calculations. A queue can be designed with a predetermined size array to store states of a respective pixel's temperature values. This is described in further detail with respect to FIGS. 1 and 2. During the initialization process, the average pixel temperature state array can be initialized with the temperature of 65° Celsius, or another selected temperature. An IIR filter or other type of initialization filter 1210 can be utilized for initialization or centering. The input signal can be centered on zero or another predetermined value so that thermal signatures can be identified regardless of the ambient temperature. In some cases, once initialization is completed, the detection filter 1212 can be utilized for pixel detection.

In step 1306, the traffic detection module 1205 can monitor pixel detections. For example, one or more of individual pixel detections, row pixel detections, and column pixel detections can be monitored and stored in individual pixel detection arrays, row pixel detection arrays, and column pixel detection arrays. Detections can be identified based on the pixel decision algorithm 1214, which can be tailored to determine whether an individual pixel, row, or column has changed Boolean states, and at what time the state change occurred.

In step 1309, the traffic detection module 1205 can identify traffic parameters 1218 based on pixel detections. For example, the traffic detection module 1205 can analyze one or more of the individual pixel detection arrays, row pixel detection arrays, and column pixel detection arrays in order to identify various traffic parameters 1218.

For example, in step 1312, the traffic detection module 1205 can identify a vehicle velocity parameter. The traffic detection module 1205 can identify a front vehicle detection in a particular column of the multiple-pixel passive infrared sensor 200 by identifying that a state in a column detection array changes from Boolean false to Boolean true. If a previous state in the column detection array is false, and the subsequent or current state in the column detection array is true, then a front detection can be identified and the timestamp of the true state can be utilized as a front detection time. A number of sequential detections for the column can be true, and then a rear detection can be identified. The traffic detection module 1205 can identify a rear vehicle detection in the column of the multiple-pixel passive infrared sensor 200 by identifying that a state in a column detection array changes from Boolean true to Boolean false. If a previous state in the column detection array is true, and the subsequent or current state in the column detection array is false, then a rear detection can be identified and the timestamp of the false state can be utilized as a rear detection time. A difference between the front detection timestamp and the rear detection timestamp can be used to identify a velocity of the vehicle. For example, the velocity can include a particular distance, such as a distance or length of the column, divided by the time difference between the front detection timestamp and the rear detection timestamp. In some cases, the traffic detection module 1205 can identify the vehicle velocity parameter as an average of respective velocities for a set of the columns which can include all or a subset of the columns. Alternatively, a difference between front detection times for different columns (or alternatively a difference between two rear detection times) can be used to identify the velocity. In this case, the velocity can be determined by dividing a distance between the different columns by the difference between front (or rear) detection times for the different columns.

In step 1314, the traffic detection module 1205 can identify a vehicle length. In some examples, the vehicle length can be determined. the traffic detection module 1205 can monitor one or more columns. To calculate the length of a vehicle's thermal signature the time the thermal signature was detected in the column, which can be the time difference between the front detection timestamp and the rear detection timestamp, can be multiplied by the velocity of the thermal signature to give the length of the signature for that column. Multiple lengths can be determined based on multiple columns, and an average van be utilized as the length.

In other examples, a number of detections in a row can be observed. The maximum number of pixel detections in a row can be recorded. The length of the vehicle can be determined based on the number of columns or pixels detected in a row, and the average row length for the set of rows detected. In some cases, the maximum for each row can be recorded and averaged to determine the length of the vehicle, or a maximum among all rows can be used to determine the length of the vehicle. In some examples, if the maximum number of detections occurs multiple times, the centermost detection set of rows can be utilized.

In step 1316, the traffic detection module 1205 can identify a vehicle height for a vehicle thermal signature. When a vehicle is detected in the Boolean detection array, the number of detections in a column can be observed. The maximum number of pixel detections in a column can be recorded. The height can be determined based on the number of rows or pixels detected in a column. In some cases, the maximum for each column can be recorded and averaged to determine the height of the vehicle. The height for a row can be determined using a method analogous to that described above regarding distance between columns.

In step 1318, the traffic detection module 1205 can identify a vehicle volume for a vehicle thermal signature. For example, the vehicle height and vehicle length as described above can be multiplied, and the product can be further multiplied by a width value. The width value can be a predetermined value equal to or less than the lane width. Additional factors or constants can be multiplied by this value to determine the vehicle volume. For example, the width can be selected based on the identified length of the vehicle. A long vehicle such as a semi truck can be associated with a wider width than very shorter vehicles such as compact cars or motorcycles, which can be associated with a narrower width.

Alternatively, the traffic detection module 1205 can identify that a number of pixels (see FIG. 7) are activated concurrently or within a threshold time. Each pixel can be associated with a height, length, and volume value (based on its height, length and the predetermined width value). The volume values can be added, or the area values can be added and multiplied by the predetermined width, in order to determine the total volume. In some cases, an average volume can be determined based on a number of different volumes identified for the vehicle at different times as it passes.

In step 1320, the traffic detection module 1205 can identify traffic statistics. For example, the traffic detection module 1205 can identify a total number of vehicles, a number vehicles for each classification identified in step 1322, an average length of vehicles, average height of vehicles, average volume of vehicles, average velocity of vehicles, and other statistics can be aggregated and identified over a particular time period. Frequencies of vehicle crossings, as well as frequencies for each vehicle classification, and other values can also be identified based on the time period.

In step 1322, the traffic detection module 1205 can identify vehicle classification for a each vehicle that is detected. One or more of the velocity, length, height, and volume can be input into a classification algorithm 1216. The classification algorithm 1216 can be a trained neural network or other machine learning algorithm that outputs a vehicle classification based on the input values.

In step 1324, the traffic detection module 1205 can determine whether to provide traffic parameter data 1242. For example, the traffic detection module 1205 can provide traffic parameter data 1242 on demand, in response to a request or command received from a client device 1234 or a remote server device 1233. In other examples, the traffic detection module 1205 can provide traffic parameter data 1242 periodically once a predetermined time has elapsed, or at a scheduled time. If a traffic parameter data 1242 request has been received, if the predetermined time has elapsed, or if the scheduled time matches a current time, then the traffic detection module 1205 can move to step 1326, otherwise the traffic detection module 1205 can move to step 1330.

In step 1326, the traffic detection module 1205 can generate traffic parameter data. For example, the traffic detection module 1205 can generate a payload that includes all or a subset of the traffic detection data 1242 that has been collected.

In step 1328, the traffic detection module 1205 can provide the traffic parameter data 1242. The traffic detection module 1205 can provide the traffic parameter data 1242 to a client device 1234 or a remote server device 1233. For example, the traffic detection module 1205 cause the traffic detection device 103 to transmit the traffic parameter data 1242 to a predetermined network location or a network location specified in the request for traffic parameter data 1242.

In step 1330, the traffic detection module 1205 can determine whether to trigger active signage based on a vehicle detection. The traffic detection module 1205 can identify that a vehicle is detected by performing an analysis of the individual pixel detections, row pixel detections, and column pixel detections stored in the individual pixel detection arrays, row pixel detection arrays, and column pixel detection arrays. The traffic detection module 1205 can determine a set of one or more warning devices 1009 to activate.

In step 1333, the traffic detection module 1205 can generate a payload for each of the warning devices 1009. The payload can include a period of time to activate each of the warning devices 1009. This active time duration can be identified for each of the warning devices 1009, based on vehicle velocity, visibility of each warning devices 1009 by approaching vehicles, as well as possible deceleration as the vehicle approaches an area of interest such as intersection, curve, bump, or other road feature.

In step 1336, the traffic detection module 1205 can transmit, to each of the identified set of warning devices 1009, the signage activation signal that includes the active time duration payload. Each warning device 1009 can be configured to activate its lighting based on a particular signage activation signal as described herein.

The flowcharts or process diagrams such FIG. 13 can be representative of certain methods or processes, functionalities, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 902. The machine code can be converted from the source code, etc. Further, each block can represent, or be connected with, a circuit or a number of interconnected circuits to implement a certain logical function or process step.

Although the flowcharts illustrate a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Aspects of the present disclosure can include concepts described with respect to any combination of the figures, and any of the following explicitly described aspects. Aspect 1 describes a system for infrared sensing and detection, the system comprising: an infrared array sensor comprising pixels arranged in a plurality of columns, wherein a respective column comprises a number of the pixels; a computing device; and a data store comprising executable instructions that, when executed, cause the computing device to at least: determine at least one vehicle parameter based at least in part on localized thermal emissions detected by the infrared sensor array, wherein the at least one vehicle parameter comprises a velocity of a vehicle; and provide a vehicle record comprising the at least one vehicle parameter.

Aspect 2 describes the system of aspect 1, wherein the instructions, when executed, cause the computing device to at least: identify a first front thermal detection based at least in part on a thermal detection state of a first column changing from negative to positive, wherein the first front thermal detection is associated with a first time; identify a second front thermal detection based at least in part on a thermal detection state of a second column changing from negative to positive, wherein the second front thermal detection is associated with a second time; and determine the velocity of the vehicle based at least in part on the first front thermal detection and the second front thermal detection.

Aspect 3 describes the system of any one of aspects 1-2, wherein the instructions, when executed, cause the computing device to at least: transmit, to a vehicle warning device, a signal that causes the vehicle warning device to activate for a time period, wherein the time period is identified based at least in part on the velocity of the vehicle.

Aspect 4 describes the system of any one of aspects 1-3, wherein the instructions, when executed, cause the computing device to at least: transmit the vehicle record to a client device or a server device, wherein the vehicle record is transmitted wirelessly using a personal area network, a local area network, or a cellular network.

Aspect 5 describes the system of any one of aspects 1-4, wherein the instructions, when executed, cause the computing device to at least: identify a front thermal detection based at least in part on a first column thermal detection state changing from positive to negative; identify a rear thermal detection based at least in part on a second column thermal detection state changing from positive to negative; and determine a vehicle length based at least in part on a time between the front thermal detection and the rear thermal detection.

Aspect 6 describes the system of any one of aspects 1-5, wherein the instructions, when executed, cause the computing device to at least: determine a vehicle height based at least in part on a maximum number of pixels activated in a particular column.

Aspect 7 describes the system of any one of aspects 1-6, wherein the instructions, when executed, cause the computing device to at least: determine a vehicle classification based at least in part on a vehicle height and a vehicle length.

Aspect 8 describes the system of any one of aspects 1-7, wherein the instructions, when executed, cause the computing device to at least: determine an average pixel temperature for a pixel; and center temperature data for the pixel by subtracting the average pixel temperature for the pixel from a previous measured temperature of the pixel.

Aspect 9 describes the system of any one of aspects 1-8, wherein the instructions, when executed, cause the computing device to at least: collect a set of vehicle data; and train a neural network to classify vehicles using the vehicle record, wherein the training comprises machine learning based at least in part on a set of vehicle data collected using the infrared array sensor.

Aspect 10 describes the system of any one of aspects 1-9, wherein the instructions include a predetermined set of distances, a respective distance of the predetermined set of distances indicating an expected vehicle distance from the infrared array sensor, wherein a selected one of the predetermined set of distances is utilized to configure the system for infrared sensing and detection for accuracy at the selected one of the predetermined set of distances.

Aspect 11 describes a method for infrared sensing and detection, the method comprising: detecting at least one vehicle parameter based at least in part on changes in thermal detection states of pixels of an infrared array sensor, wherein the at least one vehicle parameter comprises a velocity of a vehicle; and providing, using a computing device electronically connected to the infrared array sensor, a vehicle record comprising the at least one vehicle parameter.

Aspect 12 describes the method of aspect 11, further comprising: transmitting, to a vehicle warning device, a signal that causes the vehicle warning device to activate for a time period, wherein the time period is identified based at least in part on the velocity of the vehicle.

Aspect 13 describes the method of any one of aspects 11-12, further comprising: transmitting the vehicle record to a device remote from a traffic detection device comprising the infrared sensor array, the vehicle record being transmitted wirelessly using a personal area network, a local area network, or a cellular network.

Aspect 14 describes the method of any one of aspects 11-13, further comprising: training a neural network to classify vehicles using the vehicle record, wherein the training comprises machine learning based at least in part on a set of vehicle data collected using the infrared array sensor.

Aspect 15 describes the method of any one of aspects 11-14, further comprising: identifying a first thermal detection based at least in part on a first column thermal detection state of the infrared array sensor changing from positive to negative; identifying a second thermal detection based at least in part on a second column thermal detection state of the infrared array sensor changing from positive to negative; and determining a vehicle length based at least in part on a time between the front thermal detection and the rear thermal detection, wherein the a first column thermal detection state and the a first column thermal detection state are identified for one of: a single column, or two different columns.

Aspect 16 describes the method of any one of aspects 11-15, further comprising: determining a vehicle height based at least in part on a maximum number of pixels or an average number of pixels activated in a particular column of the infrared array sensor.

Aspect 17 describes the method of any one of aspects 11-16, further comprising: determining a vehicle classification is determined based at least in part on a vehicle length and a vehicle height being input into a vehicle classification neural network, where the vehicle parameters further comprise the vehicle length and the vehicle height determined based at least in part on the changes in the thermal detection states of the pixels of the infrared array sensor.

Aspect 18 describes the method of any one of aspects 11-17, further comprising: determining an average pixel temperature for a pixel of the infrared array sensor; and centering temperature data for the pixel by subtracting the average pixel temperature for the pixel from a previous measured temperature of the pixel.

Aspect 19 describes the method of any one of aspects 11-18, further comprising: identifying a thermal detection state of a first column of the infrared array sensor based at least in part on a thermal detection identified for at least one pixel of the first column.

Aspect 20 describes the method of any one of aspects 11-19, further comprising: determining a vehicle volume based at least in part on height and width parameters determined based at least in part on pixel detections of the infrared array sensor and a width value, wherein the width value is less than or equal to a lane width.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A system for infrared sensing and detection, the system comprising:
   an infrared array sensor comprising pixels arranged in a plurality of columns, wherein each column comprises a number of the pixels;
   a computing device; and
   a data store comprising executable instructions that, when executed, cause the computing device to at least:
      identify a first front thermal detection based on a thermal detection state of a first column changing from negative to positive, wherein the first front thermal detection is associated with a first time;
      identify a second front thermal detection based on a thermal detection state of a second column changing from negative to positive, wherein the second front thermal detection is associated with a second time;
      determine at least one vehicle parameter based on localized thermal emissions detected by the infrared sensor array, wherein the at least one vehicle parameter comprises a velocity of a vehicle, and the velocity of the vehicle is determined based at least in part on the first front thermal detection and the second front thermal detection; and
      provide a vehicle record comprising the at least one vehicle parameter.

2. The system of claim 1, wherein the at least one vehicle parameter comprises at least one of a volume length, a volume height, a vehicle volume, a vehicle count, a vehicle classification, and the velocity.

3. The system of claim 1, wherein the instructions, when executed, cause the computing device to at least:
   transmit, to a vehicle warning device, a signal that causes the vehicle warning device to activate for a time period, wherein the time period is identified based on the velocity of the vehicle.

4. The system of claim 3, wherein the instructions, when executed, cause the computing device to at least:
   transmit the vehicle record to a client device, wherein the vehicle record is transmitted wirelessly using a personal area network, a local area network, or a cellular network.

5. The system of claim 1, wherein the instructions, when executed, cause the computing device to at least:
   identify a front thermal detection based on a first column thermal detection state changing from positive to negative;
   identify a rear thermal detection based on a second column thermal detection state changing from positive to negative; and
   determine a vehicle length based on a time between the front thermal detection and the rear thermal detection.

6. The system of claim 5, wherein the instructions, when executed, cause the computing device to at least:
   determine a vehicle height based on a maximum number of pixels activated in a particular column.

7. The system of claim 6, wherein the instructions, when executed, cause the computing device to at least:
   determine a vehicle classification based on the vehicle height and the vehicle length.

8. The system of claim 1, wherein the instructions, when executed, cause the computing device to at least:
   determine an average pixel temperature for a pixel; and
   center temperature data for the pixel by subtracting the average pixel temperature for the pixel from a previous measured temperature of the pixel.

9. The system of claim 1, wherein the instructions, when executed, cause the computing device to at least:
   collect a set of vehicle data; and
   train a neural network to classify vehicles using the vehicle record, wherein the training comprises machine learning based on a set of vehicle data collected using the infrared array sensor.

10. The system of claim 1, wherein the instructions include a predetermined set of distances, a respective distance of the predetermined set of distances indicating an expected vehicle distance from the infrared array sensor, wherein a selected one of the predetermined set of distances is utilized to configure the system for infrared sensing and detection for accuracy at the selected one of the predetermined set of distances.

11. A method for infrared sensing and detection, the method comprising:
- identifying a front thermal detection based on a first column thermal detection state of an infrared array sensor changing from positive to negative;
- identifying a rear thermal detection based on a second column thermal detection state of the infrared array sensor changing from positive to negative;
- detecting at least one vehicle parameter based on changes in thermal detection states of pixels of the infrared array sensor, wherein the at least one vehicle parameter comprises a velocity of a vehicle, and a vehicle length, wherein the vehicle length is determined based at least in part on a time between the front thermal detection and the rear thermal detection; and
- providing, using a computing device electronically connected to the infrared array sensor, a vehicle record comprising the at least one vehicle parameter.

12. The method of claim 11, further comprising:
transmitting, to a vehicle warning device, a signal that causes the vehicle warning device to activate for a time period, wherein the time period is identified based on the velocity of the vehicle.

13. The method of claim 11, further comprising:
transmitting the vehicle record to a client device wirelessly using a personal area network, a local area network, or a cellular network.

14. The method of claim 13, further comprising:
training a neural network to classify vehicles using the vehicle record, wherein the training comprises machine learning based on a set of vehicle data collected using the infrared array sensor.

15. The method of claim 11, wherein the at least one vehicle parameter comprises at least one of a volume length, a volume height, a vehicle volume, a vehicle count, a vehicle classification, and the velocity.

16. The method of claim 11, further comprising:
determining a vehicle height based on a maximum number of pixels activated in a particular column of the infrared array sensor.

17. The method of claim 16, further comprising:
determining a vehicle classification is determined based on the vehicle length and the vehicle height, where the vehicle parameters further comprise a vehicle length and a vehicle height determined based on the changes in the thermal detection states of the pixels of the infrared array sensor.

18. The method of claim 11, further comprising:
determining an average pixel temperature for a pixel of the infrared array sensor; and
centering temperature data for the pixel by subtracting the average pixel temperature for the pixel from a previous measured temperature of the pixel.

19. The method of claim 11, further comprising:
identifying a thermal detection state of a first column of the infrared array sensor based on a thermal detection identified for at least one pixel of the first column.

20. The method of claim 11, wherein a predetermined set of distances, a respective distance indicating an expected vehicle distance from the infrared array sensor, wherein respective distances between columns are determined based on a selected distance of the predetermined set of distances.

* * * * *